US012511783B1

(12) United States Patent
Chen et al.

(10) Patent No.: US 12,511,783 B1
(45) Date of Patent: Dec. 30, 2025

(54) FISHEYE LENS OPTICAL CENTER AND DISTORTION CALIBRATION USING A SINGLE IMAGE

(71) Applicant: Ambarella International LP, Santa Clara, CA (US)

(72) Inventors: I-Hsuan Chen, New Taipei (TW); Hung-Linh Lu, New Taipei (TW)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 18/947,290

(22) Filed: Nov. 14, 2024

(51) Int. Cl.
  *G06T 7/80* (2017.01)
  *G06T 5/80* (2024.01)
  *G06T 7/00* (2017.01)
  *G06T 7/11* (2017.01)

(52) U.S. Cl.
  CPC .............. *G06T 7/80* (2017.01); *G06T 5/80* (2024.01); *G06T 7/0004* (2013.01); *G06T 7/11* (2017.01); *G06T 2207/30108* (2013.01)

(58) Field of Classification Search
  None
  See application file for complete search history.

(56) References Cited

U.S. PATENT DOCUMENTS

| | | | | |
|---|---|---|---|---|
| 2004/0095470 | A1* | 5/2004 | Tecu | H04N 23/55 348/207.99 |
| 2007/0183646 | A1* | 8/2007 | Beaty | G06T 7/0004 382/145 |
| 2007/0206833 | A1* | 9/2007 | Otsuka | G06V 20/58 348/148 |
| 2016/0267682 | A1* | 9/2016 | Yamashita | G01B 11/2513 |
| 2019/0209076 | A1* | 7/2019 | Murphy | G02F 1/132 |
| 2019/0291277 | A1* | 9/2019 | Oleynik | B25J 9/1669 |
| 2021/0055630 | A1* | 2/2021 | Oike | H04N 9/3194 |
| 2022/0230443 | A1* | 7/2022 | Hua | G06V 10/761 |
| 2025/0218040 | A1* | 7/2025 | Maye | G06T 7/521 |

* cited by examiner

*Primary Examiner* — Daniel T Tekle
(74) *Attorney, Agent, or Firm* — Maiorana Patent Law, PA

(57) ABSTRACT

An apparatus comprising an interface and a processor. The interface may be configured to receive pixel data corresponding to a wide angle field of view from a lens. The processor may be configured to receive a distortion specification corresponding the lens, generate pixel data arranged as a single calibration image in response to the wide angle field of view of the lens, perform calibration operations in response to the distortion specification and the single calibration image, and determine a distortion curve configured to correct a distortion of the lens in response to the calibration operations. A calibration scene may be captured in the single calibration image. The calibration scene may comprise three planes with a dot pattern. The calibration operations may comprise calculating an optical center of the lens and calculating the distortion curve in response to the dot pattern.

19 Claims, 14 Drawing Sheets

FISHEYE LENS OPTICAL CENTER AND DISTORTION CALIBRATION USING A SINGLE IMAGE

FIELD OF THE INVENTION

The invention relates to camera lens calibration generally and, more particularly, to a method and/or apparatus for implementing fisheye lens optical center and distortion calibration using a single image.

BACKGROUND

Fisheye lenses are a type of ultra-wide-angle lens designed to capture wide fields of view (i.e., generally ranging from 100° up to 280°). The wide-angle field of view provides some advantages, such as capturing a large area with only a single camera (i.e., for surveillance). Fisheye lenses are common in the automotive markets and consumer electronics. However, the wide fields of view of a fisheye lens also creates a large amount of visual distortion. For example, the images appear spherical with a bulge distortion (i.e., a convex distortion that results in straight lines appearing to be bending). The convex distortion can be compensated to provide an image with a corrected perspective (i.e., rectilinear field of view). Camera vendors can provide a lens distortion characteristic specification to aid in correcting the distortion. However, the lens distortion characteristic specification is not suitable for every lens. Each individual lens has intrinsic characteristics. The intrinsic characteristics of each lens need to be determined to provide accurate corrections. To achieve high accuracy, relying solely on the distortion characteristic specifications does not yield optimal results.

Parameters to compensate for the intrinsic characteristics of a lens can be determined using calibration operations. The calibration operations are generally performed during a manufacture of the cameras. Conventional calibration operations for a fisheye lens, which involves finding an optical center of the lens, can be a time-consuming process, but is not necessarily a complex process. To calculate a distortion curve to accurately correct the distortion to the real-world view involves a person (i.e., an engineer) manually placing calibration targets. The conventional calibration technique is the "Zhang-camera calibration", which requires a checkerboard patterned calibration target to be placed at multiple different positions to capture more than ten images. The ten or more images of the calibration target located at different positions is the input data used to calculate the intrinsic parameters. Capturing ten images is time consuming (i.e., the engineer manually places the calibration target at multiple different locations) and results in a slowdown of the camera production line.

It would be desirable to implement fisheye lens optical center and distortion calibration using a single image.

SUMMARY

The invention concerns an apparatus comprising an interface and a processor. The interface may be configured to receive pixel data corresponding to a wide angle field of view from a lens. The processor may be configured to receive a distortion specification corresponding the lens, generate pixel data arranged as a single calibration image in response to the wide angle field of view of the lens, perform calibration operations in response to the distortion specification and the single calibration image, and determine a distortion curve configured to correct a distortion of the lens in response to the calibration operations. A calibration scene may be captured in the single calibration image. The calibration scene may comprise three planes with a dot pattern. The calibration operations may comprise calculating an optical center of the lens and calculating the distortion curve in response to the dot pattern.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
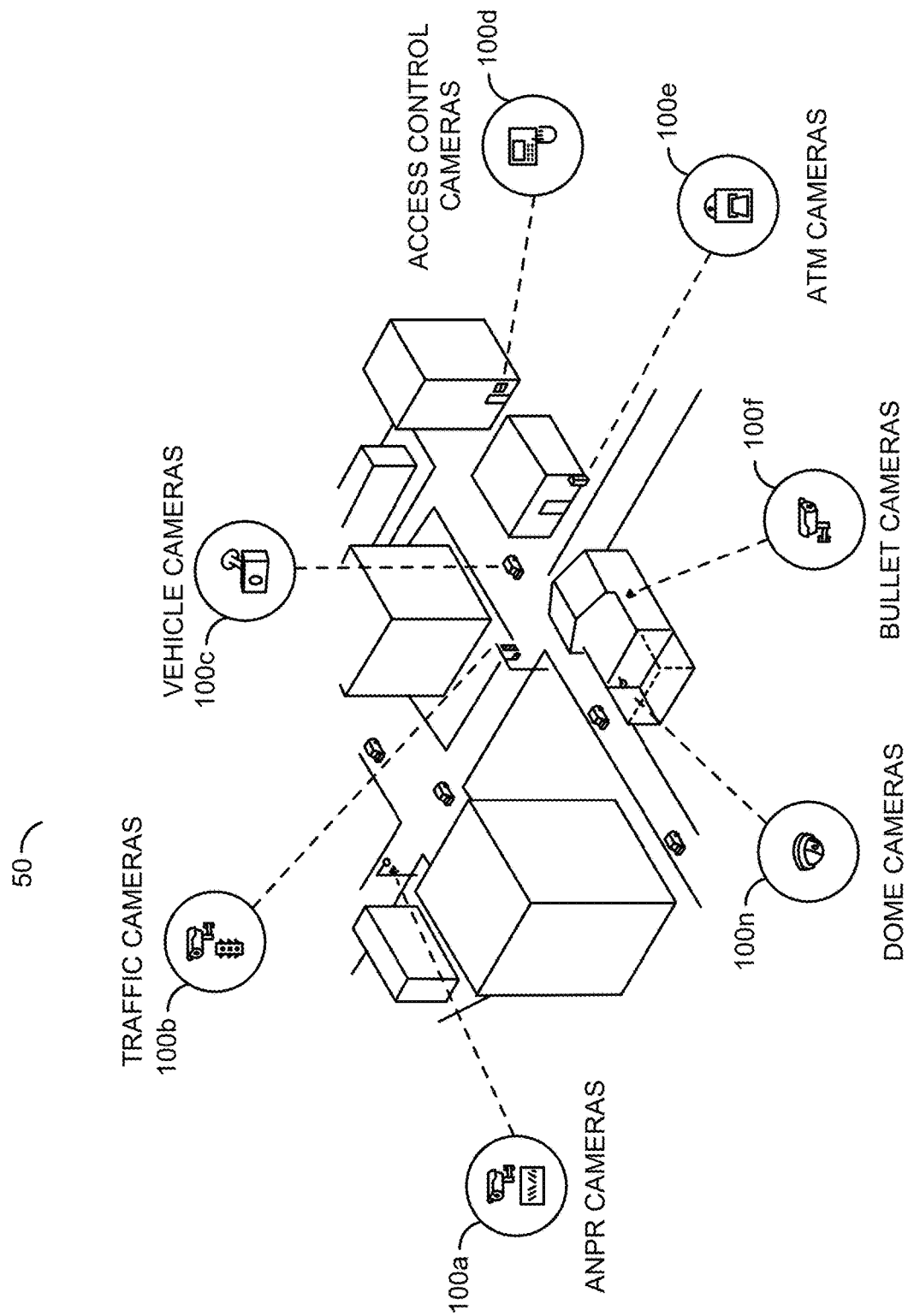
FIG. 1 is a diagram illustrating examples of cameras that may implement fisheye lens optical center and distortion calibration using a single image in accordance with example embodiments of the invention.

Embodiments of the present invention include providing fisheye lens optical center and distortion calibration using a single image that may (i) calculate a distortion curve to correct a perspective of an image captured using a wide angle lens, (ii) capture a single calibration scene to perform a calibration, (iii) detect dot positions of a dot pattern in the single calibration scene, (iv) capture three planes of red-black dots for calibration, (v) determine an optical center from the calibration scene, (vi) segment the lens into multiple segments to accurately compensate for spatially varying characteristics of the lens, (vii) perform a polynomial fitting of multiple segments to determine the distortion curve, (viii) detect an optical center using a straightness scoring system based on an optical center table, (ix) reduce a manufacture time for camera production and/or (x) be implemented as one or more integrated circuits.

Embodiments of the present invention may be configured to enable lens calibration for wide and ultra-wide angle lenses (e.g., fisheye lenses). The lens calibration may be configured to determine a distortion curve. The distortion curve may be applied (e.g., as an image transformation) to correct a perspective of images generated using a fisheye lens (e.g., compensate for the distortion characteristics of the lens to provide a rectilinear perspective). The lens calibration may be performed using a lens distortion specification (e.g., a default value often provided by a camera and/or lens vendor) and a single calibration image. Implementing the lens calibration using the single calibration image may provide a faster and/or more streamlined calibration process for determining the distortion curve. For example, the Zhang-camera calibration comprises capturing at least ten calibration images, which may involve a person physically moving a calibration target each time one of the ten or more calibration images is captured. The single calibration image may involve a person positioning the camera a single time to capture the calibration image, which may save a significant amount of time. For example, a camera manufacturing process may comprise a production line of many cameras, and the calibration process may be a bottleneck for the production line. The reduction in time by implementing the single calibration image for determining the distortion curve may reduce an impact of the bottleneck caused by lens calibration for the production line.

Embodiments of the present invention may be configured to perform the lens calibration based on a particular type of calibration scene. The particular type of calibration scene may comprise three planes (e.g., similar to a Cartesian coordinate system with an X-plane, Y-plane, and Z-plane). Each of the three planes of the calibration scene may comprise a dot pattern. In an example, the dot pattern may comprise a combination of red dots and black dots. Each of the three planes may comprise a line to separate the three planes area. For example, red lines may be at a border of each of the three planes (e.g., creating a seam at the axes where the planes meet). Each of the three planes of the calibration scene may comprise a combination of the line and the dot pattern.

The distortion curve may be calculated in response to detecting positions of the dots in the dot pattern of the calibration scene. Detecting the positions of the dots may enable calculating an optical center and/or the distortion curve. The dot pattern may provide a higher resolution of data for accurately detecting the larger portions of distortion compared to detecting the corners of a checkerboard pattern.

Embodiments of the present invention may be configured to streamline a process for the lens calibration. For example, fisheye lens optical center and distortion calibration using a single image may be efficiently implemented as part of a camera manufacturing production line. The lens calibration may enable a determination of the intrinsic lens distortion characteristics of individual camera lenses. For example, the lens distortion specification alone may not be suitable for every lens. The lens calibration may be configured to provide high accuracy results to determine the intrinsic parameters of the lenses and determine the distortion curve. Applying the distortion curve may enable a processor of the camera to generate images that may correct the distortion caused by the wide angle lenses. For example, applying the distortion curve may enable a rectilinear perspective to be generated from the wide angle view captured that may be suitable for surveillance, automotive cameras, consumer cameras, etc.

Embodiments of the present invention may be configured to calculate the distortion curve for the lens of a camera in response to performing a detection of the calibration scene, a calculation of an optical center, and performing a polynomial fit to determine the distortion curve. To enable accurate detection of the calibration scene, the calibration scene may be manually placed by a person (e.g., an engineer, a technician, a production line worker, etc.). The detection of the calibration scene may comprise determining the location of the dot pattern, applying the distortion specification, and performing a transformation to correct a shape of the dots in the dot pattern, detect the dot centers and then converting back to a raw image domain (e.g., acquiring raw image positions). The optical center calculation may comprise implementing a straightness scoring system. For example, an assumed optical center (e.g., test positions) and the distortion specification may be applied to an optical center test table (e.g., a 3×3 optical center test table). A straightness scoring error may be determined and a search may be performed to find a pixel for the optical center.

The calculation of the polynomial fit for the distortion curve may be performed based on the dot positions (e.g., raw image positions) determined. For example, the polynomial fitting may be performed based on a mapping relationship between the dot positions and a perspective transform. To generate an accurate polynomial fit, the data may be segmented into sections based on distance from the optical center of the lens. For example, in regions of the lens with larger distortion, an amount of error may be greater. A single polynomial fit may comprise a higher amount of erroneous data, which may provide poor results for the distortion curve (e.g., some segments may be overfitted while some segments may be underfitted). The segmentation may enable flexibility to adapt to local variations in the data.

Referring to FIG. 1, a diagram illustrating examples of cameras that may implement fisheye lens optical center and distortion calibration using a single image in accordance with example embodiments of the invention. An overhead view of an area 50 is shown. In the example shown, the area 50 may be an outdoor location. Streets, vehicles and buildings are shown.

Devices 100a-100n are shown at various locations in the area 50. The devices 100a-100n may each implement an edge device. The edge devices 100a-100n may comprise smart IP cameras (e.g., camera systems). The edge devices 100a-100n may comprise low power technology designed to be deployed in embedded platforms at the edge of a network (e.g., microprocessors running on sensors, cameras, or other battery-powered devices), where power consumption is a critical concern. In an example, the edge devices 100a-100n may comprise various traffic cameras and intelligent transportation systems (ITS) solutions.

The edge devices 100a-100n may be implemented for various applications. In the example shown, the edge devices 100a-100n may comprise automated number plate recognition (ANPR) cameras 100a, traffic cameras 100b, vehicle cameras 100c, access control cameras 100d, automatic teller machine (ATM) cameras 100e, bullet cameras 100f, dome cameras 100n, etc. In an example, the edge devices 100a-100n may be implemented as traffic cameras and intelligent transportation systems (ITS) solutions designed to enhance roadway security with a combination of person and vehicle detection, vehicle make/model recognition, and automatic number plate recognition (ANPR) capabilities.

In the example shown, the area 50 may be an outdoor location. In some embodiments, the edge devices 100a-100n may be implemented at various indoor locations. In an example, edge devices 100a-100n may incorporate a convolutional neural network in order to be utilized in security (surveillance) applications and/or access control applications. In an example, the edge devices 100a-100n implemented as security camera and access control applications may comprise battery-powered cameras, doorbell cameras, outdoor cameras, indoor cameras, etc. The security camera and access control applications may realize performance benefits from application of a convolutional neural network in accordance with embodiments of the invention. In an example, an edge device utilizing a convolutional neural network in accordance with an embodiment of the invention may take massive amounts of image data and make on-device inferences to obtain useful information (e.g., multiple time instances of images per network execution) with reduced bandwidth and/or reduced power consumption. In another example, security (surveillance) applications and/or location monitoring applications (e.g., trail cameras) may benefit from a large amount of optical zoom. The design, type and/or application performed by the edge devices 100a-100n may be varied according to the design criteria of a particular implementation.

The camera systems 100a-100n may capture video using a fisheye lens in the outdoor location area 50. The fisheye lens may provide a wide (or ultra-wide) angle field of view. The wide angle field of view may enable cameras such as the ATM cameras 100e and/or the access control cameras 100d (e.g., stationary cameras) to capture a large portion of the outdoor location area 50 from a single location. The fisheye lens implemented by the camera systems 100a-100n may cause a distortion of the captured location area 50 in the raw video frames. The camera systems 100a-100n may be configured to correct the distortion caused by the fisheye lens using a distortion curve. The distortion curve may be determined at a manufacturing time of the camera systems 100a-100n. Each of the camera systems 100a-100n may be configured to determine the distortion curve based on the fisheye lens optical center and distortion calibration using a single image.

Figure 2:
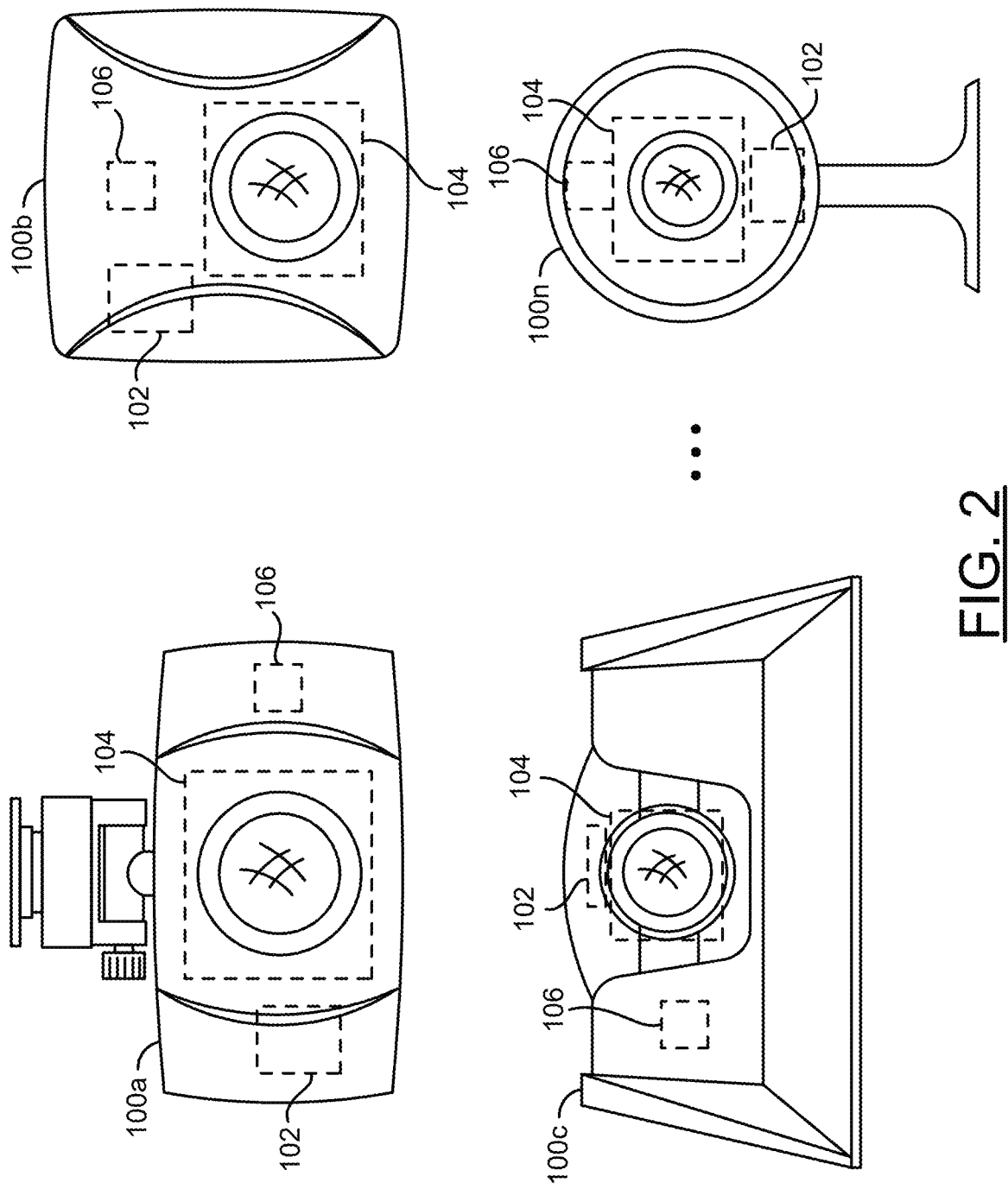
FIG. 2 is a diagram illustrating example edge device cameras.

Referring to FIG. 2, a diagram illustrating example edge device cameras is shown. The camera systems 100a-100n are shown. Each camera device 100a-100n may have a different style and/or use case. For example, the camera 100a may be an action camera, the camera 100b may be a ceiling mounted security camera, the camera 100n may be a webcam, etc. Other types of cameras may be implemented (e.g., home security cameras, battery powered cameras, doorbell cameras, stereo cameras, etc.). In some embodiments, the camera systems 100a-100n may be stationary cameras (e.g., installed and/or mounted at a single location). In some embodiments, the camera systems 100a-100n may be handheld cameras. In some embodiments, the camera systems 100a-100n may be configured to pan across an area, may be attached to a mount, a gimbal, a camera rig, etc. The design/style of the cameras 100a-100n may be varied according to the design criteria of a particular implementation.

Each of the camera systems 100a-100n may comprise a block (or circuit) 102, a block (or circuit) 104 and/or a block (or circuit) 106. The circuit 102 may implement a processor. The circuit 104 may implement a capture device. The circuit 106 may implement an inertial measurement unit (IMU). The camera systems 100a-100n may comprise other components (not shown). Details of the components of the cameras 100a-100n may be described in association with FIG. 3.

The processor 102 may be configured to implement an artificial neural network (ANN). In an example, the ANN may comprise a convolutional neural network (CNN). The processor 102 may be configured to implement a video encoder. The processor 102 may be configured to process the pixel data arranged as video frames. The capture device 104 may be configured to capture pixel data that may be used by the processor 102 to generate video frames. The IMU 106 may be configured to generate movement data (e.g., vibration information, an amount of camera shake, panning direction, etc.). In some embodiments, a structured light projector may be implemented for projecting a speckle pattern onto the environment. The capture device 104 may capture the pixel data comprising a background image (e.g., the environment) with the speckle pattern. While each of the cameras 100a-100n are shown without implementing a structured light projector, some of the cameras 100a-100n may be implemented with a structured light projector (e.g., cameras that implement a sensor that capture IR light).

The cameras 100a-100n may be edge devices. The processor 102 implemented by each of the cameras 100a-100n may enable the cameras 100a-100n to implement various functionality internally (e.g., at a local level). For example, the processor 102 may be configured to perform object/event detection (e.g., computer vision operations), 3D reconstruction, liveness detection, depth map generation, video encoding, electronic image stabilization and/or video transcoding on-device). For example, even advanced processes such as computer vision and 3D reconstruction may be performed by the processor 102 without uploading video data to a cloud service in order to offload computation-heavy functions (e.g., computer vision, video encoding, video transcoding, etc.).

In some embodiments, multiple camera systems may be implemented (e.g., camera systems 100a-100n may operate independently from each other). For example, each of the cameras 100a-100n may individually analyze the pixel data captured and perform the event/object detection locally. In some embodiments, the cameras 100a-100n may be configured as a network of cameras (e.g., security cameras that send video data to a central source such as network-attached storage and/or a cloud service). The locations and/or configurations of the cameras 100a-100n may be varied according to the design criteria of a particular implementation.

The capture device 104 of each of the camera systems 100a-100n may comprise a single lens (e.g., a monocular camera). The processor 102 may be configured to accelerate preprocessing of the speckle structured light for monocular 3D reconstruction. Monocular 3D reconstruction may be performed to generate depth images and/or disparity images without the use of stereo cameras.

Figure 3:
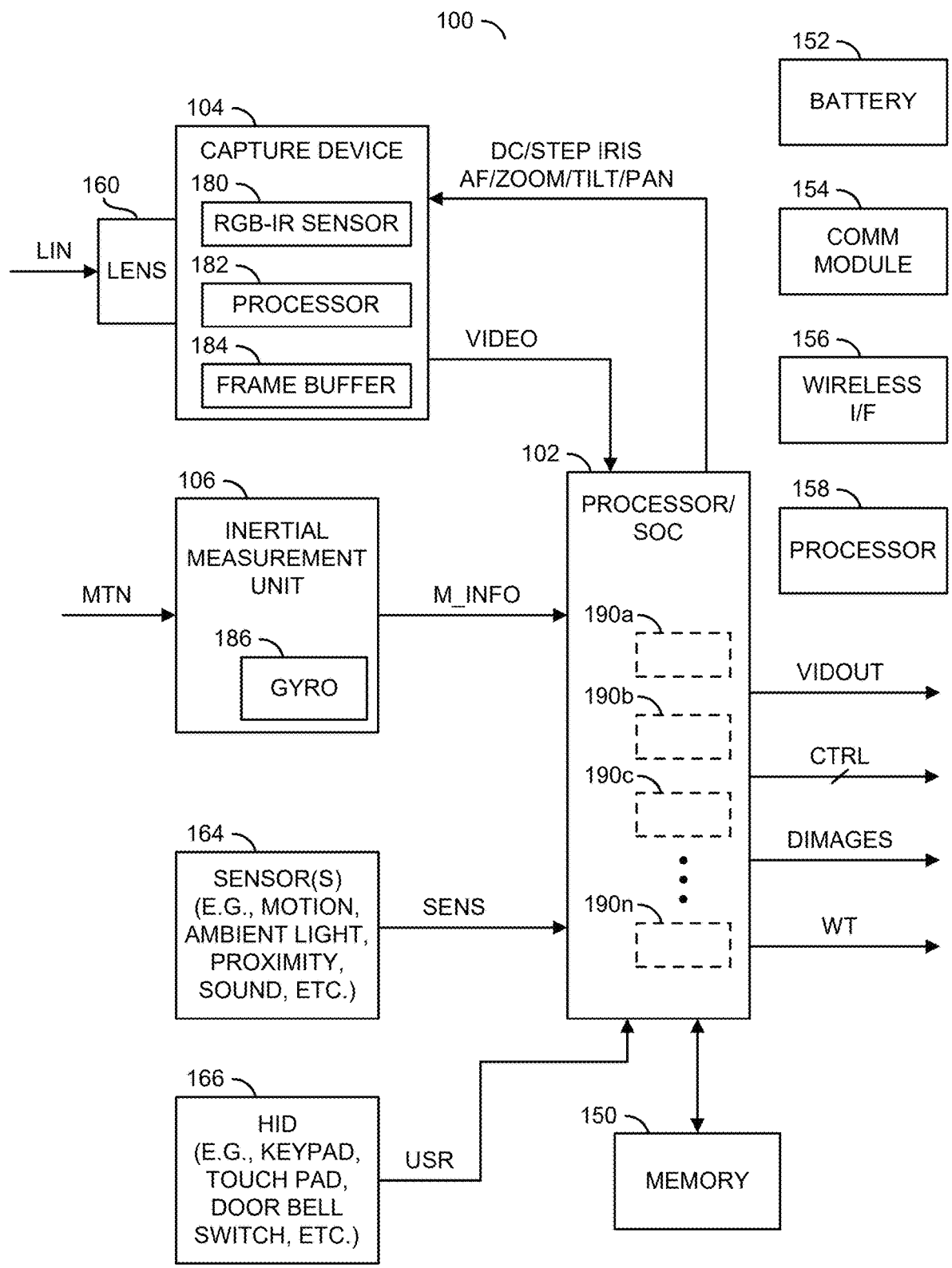
FIG. 3 is a block diagram illustrating a camera system.

Referring to FIG. 3, a block diagram illustrating a camera system is shown. The camera system (or apparatus) 100 may be a representative example of the cameras 100a-100n shown in association with FIG. 2 and/or the cameras 100a-100e shown in association with FIG. 3. The camera system 100 may comprise the processor/SoC 102, the capture device 104, and the IMU 106.

The camera system 100 may further comprise a block (or circuit) 150, a block (or circuit) 152, a block (or circuit) 154, a block (or circuit) 156, a block (or circuit) 158, a block (or circuit) 160, a block (or circuit) 164, and/or a block (or circuit) 166. The circuit 150 may implement a memory. The circuit 152 may implement a battery. The circuit 154 may implement a communication device. The circuit 156 may implement a wireless interface. The circuit 158 may implement a general purpose processor. The block 160 may implement an optical lens. The circuit 164 may implement one or more sensors. The circuit 166 may implement a human interface device (HID). In some embodiments, the camera system 100 may comprise the processor/SoC 102, the capture device 104, the IMU 106, the memory 150, the lens 160, the sensors 164, the battery 152, the communication module 154, the wireless interface 156 and the processor 158. In another example, the camera system 100 may comprise processor/SoC 102, the capture device 104, the IMU 106, the processor 158, the lens 160, and the sensors 164 as one device, and the memory 150, the battery 152, the communication module 154, and the wireless interface 156 may be components of a separate device. The camera system 100 may comprise other components (not shown). The number, type and/or arrangement of the components of the camera system 100 may be varied according to the design criteria of a particular implementation.

In some embodiments, the processor 102 may be implemented as a video processor. In an example, the processor 102 may be configured to receive triple-sensor video input with high-speed SLVS/MIPI-CSI/LVCMOS interfaces. In some embodiments, the processor 102 may be configured to perform depth sensing in addition to generating video frames. In an example, the depth sensing may be performed in response to depth information and/or vector light data captured in the video frames. In some embodiments, the processor 102 may be implemented as a dataflow vector processor. In an example, the processor 102 may comprise a highly parallel architecture configured to perform image/video processing and/or radar signal processing.

The memory 150 may store data. The memory 150 may implement various types of memory including, but not limited to, a cache, flash memory, memory card, random access memory (RAM), dynamic RAM (DRAM), etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, feature sets, radar data cubes, radar detections and/or metadata information. In some embodiments, the memory 150 may store reference images. The reference images may be used for computer vision operations, 3D reconstruction, auto-exposure, etc. In some embodiments, the reference images may comprise reference structured light images.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, 3D reconstruction CNN, liveness detection CNN, etc.) stored in the memory 150. In an example, the memory 150 may store one or more directed acyclic graphs (DAGs) and one or more sets of weights and biases defining the one or more artificial neural network models. In yet another example, the memory 150 may store instructions to perform transformational operations (e.g., Discrete Cosine Transform, Discrete Fourier Transform, Fast Fourier Transform, etc.). The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the camera system 100. The dynamic driver mechanism for a rolling shutter sensor may be configured to conserve power consumption. Reducing the power consumption may enable the camera system 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a DisplayPort interface, a Lightning port, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the camera system 100. The broadcast signal may send video data, disparity data and/or a control signal(s) to external devices. For example, the broadcast signal may be sent to a cloud storage service (e.g., a storage service capable of scaling on demand). In some embodiments, the communications module 154 may not transmit data until the processor/SoC 102 has performed video analytics and/or radar signal processing to determine that an object is in the field of view of the camera system 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the camera system 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 102 for determining which types of objects correspond to an object and/or event of interest.

In some embodiments, the communications module 154 and/or the wireless interface 156 may be configured to receive user input. The user input may enable a user to adjust operating parameters for various features implemented by the processor 102. In some embodiments, the communications module 154 and/or the wireless interface 156 may be configured to interface (e.g., using an application programming interface (API) with an application (e.g., an app). For example, the app may be implemented on a smartphone to enable an end user to adjust various settings and/or parameters for the various features implemented by the processor 102 (e.g., set video resolution, select frame rate, select output format, set tolerance parameters for 3D reconstruction, etc.).

The processor 158 may be implemented using a general purpose processor circuit. The processor 158 may be operational to interact with the video processing circuit 102 and the memory 150 to perform various processing tasks. The processor 158 may be configured to execute computer readable instructions. In one example, the computer readable instructions may be stored by the memory 150. In some embodiments, the computer readable instructions may comprise controller operations. Generally, input from the sensors 164 and/or the human interface device 166 are shown being received by the processor 102. In some embodiments, the general purpose processor 158 may be configured to receive and/or analyze data from the sensors 164 and/or the HID 166 and make decisions in response to the input. In some embodiments, the processor 158 may send data to and/or receive data from other components of the camera system 100 (e.g., the battery 152, the communication module 154 and/or the wireless interface 156). In some embodiments, the processor 158 may implement an integrated digital signal processor (IDSP). For example, the IDSP 158 may be configured to implement a warp engine. Which of the functionality of the camera system 100 is performed by the processor 102 and the general purpose processor 158 may be varied according to the design criteria of a particular implementation.

The lens 160 may be attached to the capture device 104. The capture device 104 may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 104 and/or the lens 160 may be implemented, in one example, as a single lens assembly. In another example, the lens 160 may be a separate implementation from the capture device 104.

The capture device 104 may be configured to convert the input light LIN into computer readable data. The capture device 104 may capture data received through the lens 160 to generate raw pixel data. In some embodiments, the capture device 104 may capture data received through the lens 160 to generate bitstreams (e.g., generate video frames). For example, the capture devices 104 may receive focused light from the lens 160. The lens 160 may be directed, tilted, panned, zoomed and/or rotated to provide a targeted view from the camera system 100 (e.g., a view for a video frame, a view for a panoramic video frame captured using multiple camera systems 100a-100n, a target image and reference image view for stereo vision, etc.). The capture device 104 may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 102. In some embodiments, the pixel data generated by the capture device 104 may be uncompressed and/or raw data generated in response to the focused light from the lens 160. In some embodiments, the output of the capture device 104 may be digital video signals.

In an example, the capture device 104 may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the camera system 100. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 104. Generally, the image sensor 180 is located behind the lens 160. Based on the captured light from the lens 160, the capture device 104 may generate a bitstream and/or video data (e.g., the signal VIDEO).

The capture device 104 may be configured to capture video image data (e.g., light collected and focused by the lens 160). The capture device 104 may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the camera system 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 180 may perform a photoelectric conversion of the light received by the lens 160. The processor/logic 182 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 104 may comprise a microphone for capturing audio. In some embodiments, the microphone may be implemented as a separate component (e.g., one of the sensors 164).

The video data captured by the capture device 104 may be represented as a signal/bitstream/data VIDEO (e.g., a digital video signal). The capture device 104 may present the signal VIDEO to the processor/SoC 102. The signal VIDEO may represent the video frames/video data. The signal VIDEO may be a video stream captured by the capture device 104. In some embodiments, the signal VIDEO may comprise pixel data that may be operated on by the processor 102 (e.g., a video processing pipeline, an image signal processor (ISP), etc.). The processor 102 may generate the video frames in response to the pixel data in the signal VIDEO.

The signal VIDEO may comprise pixel data arranged as video frames. In some embodiments, the signal VIDEO may be images comprising a background (e.g., objects and/or the environment captured) and the speckle pattern generated by a structured light projector. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be implemented as an RGB sensor, an RGB-IR sensor, an RCCB sensor, a monocular image sensor, stereo image sensors, a thermal sensor, an event-based sensor, etc. For example, the image sensor 180 may be any type of sensor configured to provide sufficient output for computer vision operations to be performed on the output data (e.g., neural network-based detection). In some embodiments, the image sensor 180 may be configured to generate an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light.

In some embodiments, the camera sensor 180 may comprise a rolling shutter sensor or a global shutter sensor. In an example, the rolling shutter sensor 180 may implement an RGB-IR sensor. In some embodiments, the capture device 104 may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In some embodiments, the image sensor 180 may be implemented as a CMOS sensor configured to implement a Bayer pattern. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 180 and generate (e.g., encode) video data (e.g., the bitstream) based on the raw data. The capture device 104 may have the memory 184 to store the raw data and/or the processed bitstream. For example, the capture device 104 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 104. The processor/logic 182 may provide status information about the captured video frames.

The IMU 106 may be configured to detect motion and/or movement of the camera system 100. The IMU 106 is shown receiving a signal (e.g., MTN). The signal MTN may comprise a combination of forces acting on the camera system 100. The signal MTN may comprise movement, vibrations, shakiness, a panning direction, jerkiness, etc. The signal MTN may represent movement in three dimensional space (e.g., movement in an X direction, a Y direction and a Z direction). The type and/or amount of motion received by the IMU 106 may be varied according to the design criteria of a particular implementation.

The IMU 106 may comprise a block (or circuit) 186. The circuit 186 may implement a motion sensor. In one example, the motion sensor 186 may be a gyroscope. The gyroscope 186 may be configured to measure the amount of movement. For example, the gyroscope 186 may be configured to detect an amount and/or direction of the movement of the signal MTN and convert the movement into electrical data. The IMU 106 may be configured to determine the amount of movement and/or the direction of movement measured by the gyroscope 186. The IMU 106 may convert the electrical data from the gyroscope 186 into a format readable by the processor 102. The IMU 106 may be configured to generate a signal (e.g., M_INFO). The signal M_INFO may comprise the measurement information in the format readable by the processor 102. The IMU 106 may present the signal M_INFO to the processor 102. The number, type and/or arrangement of the components of the IMU 106 and/or the number, type and/or functionality of the signals communicated by the IMU 106 may be varied according to the design criteria of a particular implementation.

The sensors 164 may implement a number of sensors including, but not limited to, motion sensors, ambient light sensors, proximity sensors (e.g., ultrasound, radar, passive infrared, lidar, etc.), audio sensors (e.g., a microphone), etc. In embodiments implementing a motion sensor, the sensors 164 may be configured to detect motion anywhere in the field of view monitored by the camera system 100 (or in some locations outside of the field of view). In various embodiments, the detection of motion may be used as one threshold for activating the capture device 104. The sensors 164 may be implemented as an internal component of the camera system 100 and/or as a component external to the camera system 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/

SoC 102. In an example, the sensors 164 may generate (assert) the signal SENS when motion is detected in the field of view monitored by the camera system 100. In another example, the sensors 164 may generate (assert) the signal SENS when triggered by audio in the field of view monitored by the camera system 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. In one example, the HID 166 may be configured to receive a password input from a user. In another example, the HID 166 may be configured to receive user input in order to provide various parameters and/or settings to the processor 102 and/or the memory 150. In some embodiments, the camera system 100 may include a keypad, a touch pad (or screen), a doorbell switch, and/or other human interface devices (HIDs) 166. In an example, the sensors 164 may be configured to determine when an object is in proximity to the HIDs 166. In an example where the camera system 100 is implemented as part of an access control application, the capture device 104 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 102 to enable two-factor authentication. The HID 166 may present a signal (e.g., USR) to the processor 102. The signal USR may comprise the input received by the HID 166.

In embodiments of the camera system 100 that implement a structured light projector, the structured light projector may comprise a structured light pattern lens and/or a structured light source. The structured source may be configured to generate a structured light pattern signal (e.g., a speckle pattern) that may be projected onto an environment near the camera system 100. The structured light pattern may be captured by the capture device 104 as part of the light input LIN. The structured light pattern lens may be configured to enable structured light generated by a structured light source of the structured light projector to be emitted while protecting the structured light source. The structured light pattern lens may be configured to decompose the laser light pattern generated by the structured light source into a pattern array (e.g., a dense dot pattern array for a speckle pattern).

In an example, the structured light source may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern (e.g., the signal SLP). The lens is generally configured to decompose the laser light pattern to a dense dot pattern array. In an example, the structured light source may implement a near infrared (NIR) light source. In various embodiments, the light source of the structured light source may be configured to emit light with a wavelength of approximately 940 nanometers (nm), which is not visible to the human eye. However, other wavelengths may be utilized. In an example, a wavelength in a range of approximately 800-1000 nm may be utilized.

The processor/SoC 102 may receive the signal VIDEO, the signal M_INFO, the signal SENS, and the signal USR.

The processor/SoC 102 may generate one or more video output signals (e.g., VIDOUT), one or more control signals (e.g., CTRL), one or more depth data signals (e.g., DIMAGES) and/or one or more warp table data signals (e.g., WT) based on the signal VIDEO, the signal M_INFO, the signal SENS, the signal USR and/or other input. In some embodiments, the signals VIDOUT, DIMAGES, WT and CTRL may be generated based on analysis of the signal VIDEO and/or objects detected in the signal VIDEO. In some embodiments, the signals VIDOUT, DIMAGES, WT and CTRL may be generated based on analysis of the signal VIDEO, the movement information captured by the IMU 106 and/or the intrinsic properties of the lens 160 and/or the capture device 104.

In various embodiments, the processor/SoC 102 may be configured to perform one or more of feature extraction, object detection, object tracking, electronic image stabilization, 3D reconstruction, liveness detection and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data, the warp table data signal WT and/or the depth data signal DIMAGES comprising disparity maps and depth maps from the signal VIDEO. The video output signal VIDOUT the warp table data signal WT and/or the depth data signal DIMAGES may be presented to the memory 150, the communications module 154, and/or the wireless interface 156. In some embodiments, the video signal VIDOUT the warp table data signal WT and/or the depth data signal DIMAGES may be used internally by the processor 102 (e.g., not presented as output). In one example, the warp table data signal WT may be used by a warp engine implemented by a digital signal processor (e.g., the processor 158).

The signal VIDOUT may be presented to the communication module 154 and/or the wireless interface 156. In some embodiments, the signal VIDOUT may comprise encoded video frames generated by the processor 102. In some embodiments, the encoded video frames may comprise a full video stream (e.g., encoded video frames representing all video captured by the capture device 104). The encoded video frames may be encoded, cropped, stitched, stabilized and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 102 on the video frames generated. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). Similarly other video processing and/or encoding operations (e.g., stabilization, compression, stitching, cropping, rolling shutter effect correction, etc.) may be performed by the processor 102 locally. For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal VIDOUT may be data generated by the processor 102 (e.g., video analysis results, audio/speech analysis results, stabilized video frames, etc.) that may be communicated to a cloud computing service in order to aggregate information and/or provide training data for machine learning (e.g., to improve object detection, to improve audio detection, to improve liveness detection, etc.). In some embodiments, the signal VIDOUT may be provided to a cloud service for mass storage (e.g., to enable a user to retrieve the encoded video using a smartphone and/or a desktop computer). In some embodiments, the signal VIDOUT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VIDOUT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operation of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 102. The signal CTRL may be generated based on a type of object detected (e.g., a person, an animal, a vehicle, etc.). The signal CTRL may be generated in response to particular types of objects being detected in particular locations. The signal CTRL may be generated in response to user input in order to provide various parameters and/or settings to the processor 102 and/or the memory 150. The processor 102 may be configured to generate the signal CTRL in response to sensor fusion operations (e.g., aggregating information received from disparate sources). The processor 102 may be configured to generate the signal CTRL in response to results of liveness detection performed by the processor 102. The conditions for generating the signal CTRL may be varied according to the design criteria of a particular implementation.

The signal DIMAGES may comprise one or more of depth maps and/or disparity maps generated by the processor 102. The signal DIMAGES may be generated in response to 3D reconstruction performed on the monocular single-channel images. The signal DIMAGES may be generated in response to analysis of the captured video data and the structured light pattern.

The multi-step approach to activating and/or disabling the capture device 104 based on the output of the motion sensor 164 and/or any other power consuming features of the camera system 100 may be implemented to reduce a power consumption of the camera system 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The camera system 100 may be configured to operate using various power states. For example, in the power-down state (e.g., a sleep state, a low-power state) the motion sensor of the sensors 164 and the processor/SoC 102 may be on and other components of the camera system 100 (e.g., the image capture device 104, the memory 150, the communications module 154, etc.) may be off. In another example, the camera system 100 may operate in an intermediate state. In the intermediate state, the image capture device 104 may be on and the memory 150 and/or the communications module 154 may be off. In yet another example, the camera system 100 may operate in a power-on (or high power) state. In the power-on state, the sensors 164, the processor/SoC 102, the capture device 104, the memory 150, and/or the communications module 154 may be on. The camera system 100 may consume some power from the battery 152 in the power-down state (e.g., a relatively small and/or minimal amount of power). The camera system 100 may consume more power from the battery 152 in the power-on state. The number of power states and/or the components of the camera system 100 that are on while the camera system 100 operates in each of the power states may be varied according to the design criteria of a particular implementation.

In some embodiments, the camera system 100 may be implemented as a system on chip (SoC). For example, the camera system 100 may be implemented as a printed circuit board comprising one or more components. The camera system 100 may be configured to perform intelligent video analysis on the video frames of the video. The camera system 100 may be configured to crop and/or enhance the video.

In some embodiments, the video frames may be some view (or derivative of some view) captured by the capture device 104. The pixel data signals may be enhanced by the processor 102 (e.g., color conversion, noise filtering, auto exposure, auto white balance, auto focus, etc.). In some embodiments, the video frames may provide a series of cropped and/or enhanced video frames that improve upon the view from the perspective of the camera system 100 (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The encoded video frames may be processed locally. In one example, the encoded video may be stored locally by the memory 150 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

In some embodiments, the processor 102 may be configured to perform sensor fusion operations. The sensor fusion operations performed by the processor 102 may be configured to analyze information from multiple sources (e.g., the capture device 104, the IMU 106, the sensors 164 and the HID 166). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from directional audio. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100. However, the computer vision operations performed using the feature set may be performed using the computational resources of the processor 102 within the camera system 100.

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 MPixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

In some embodiments, the camera sensor 180 may implement a high-resolution sensor. Using the high resolution sensor 180, the processor 102 may combine over-sampling of the image sensor 180 with digital zooming within a cropped area. The over-sampling and digital zooming may each be one of the video operations performed by the processor 102. The over-sampling and digital zooming may be implemented to deliver higher resolution images within the total size constraints of a cropped area. In some embodiments, the camera sensor 180 may implement a low-cost CMOS sensor. For example, the CMOS sensor 180 may be configured to capture 1080p resolution video.

In some embodiments, the lens 160 may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensor 180. The over-sampling of the image sensor 180 may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

In some embodiments, the processor 102 may implement one or more coprocessors, cores and/or chiplets. For example, the processor 102 may implement one coprocessor configured as a general purpose processor and another coprocessor configured as a video processor. In some embodiments, the processor 102 may be a dedicated hardware module designed to perform particular tasks. In an example, the processor 102 may implement an AI accelerator. In another example, the processor 102 may implement a radar processor. In yet another example, the processor 102 may implement a dataflow vector processor. In some embodiments, other processors implemented by the apparatus 100 may be generic processors and/or video processors (e.g., a coprocessor that is physically a different chipset and/or silicon from the processor 102). In one example, the processor 102 may implement an x86-64 instruction set. In another example, the processor 102 may implement an ARM instruction set. In yet another example, the processor 102 may implement a RISC-V instruction set. The number of cores, coprocessors, the design optimization and/or the instruction set implemented by the processor 102 may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline, a radar signal processing pipeline and/or an AI processing pipeline. The circuits 190a-190n may be configured to receive the pixel data VIDEO, generate the video frames from the pixel data, perform various operations on the video frames (e.g., dewarping, rolling shutter correction, cropping, upscaling, image stabilization, 3D reconstruction, liveness detection, auto-exposure, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190a-190n may be configured to implement various security features (e.g., secure boot, I/O virtualization, etc.). Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831,549, filed on Apr. 16, 2020 (now U.S. Pat. No. 11,586,843), U.S. patent application Ser. No. 16/288,922, filed on Feb. 28, 2019 (now U.S. Pat. No. 11,001,231), U.S. patent application Ser. No. 15/593,463, filed on May 12, 2017 (now U.S. Pat. No. 10,437,600), U.S. patent application Ser. No. 15/931,942, filed on May 14, 2020 (now U.S. Pat. No. 11,645,706), U.S. patent application Ser. No. 16/991,344, filed on Aug. 12, 2020 (now U.S. Pat. No. 12,374,107) , U.S. patent application Ser. No. 17/479,034, filed on Sep. 20, 2021 (now U.S. Pat. No. 12,002,229), appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, 3D reconstruction, depth map generation, liveness detection, etc.) to be performed locally by the camera system 100.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron in one layer to every neuron in the other layer. In a fully-connected layer, for n inputs and m outputs, there are n*m weights. There is also a bias value for each output node, resulting in a total of (n+1)*m parameters. In an already-trained neural network, the (n+1)*m parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

In the example shown, the artificial neural network 190b may implement a convolutional neural network (CNN) module. The CNN module 190b may be configured to perform the computer vision operations on the video frames. The CNN module 190b may be configured to implement recognition of objects through multiple layers of feature detection. The CNN module 190b may be configured to calculate descriptors based on the feature detection performed. The descriptors may enable the processor 102 to determine a likelihood that pixels of the video frames correspond to particular objects (e.g., a particular make/model/year of a vehicle, identifying a person as a particular individual, detecting a type of animal, detecting characteristics of a face, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be configured to perform face detection, face recognition and/or liveness judgment. For example, face detection, face recognition and/or liveness judgment may be performed based on a trained neural network implemented by the CNN module 190b. In some embodiments, the CNN module 190b may be configured to generate the depth image from the structured light pattern. The CNN module 190b may be configured to perform various detection and/or recognition operations and/or perform 3D recognition operations.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190b as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190b may be configured to perform the feature detection on the video frames in order to generate the descriptors. The CNN module 190b may perform the object detection to determine regions of the video frame that have a high likelihood of matching the particular object. In one example, the types of object(s) to match against (e.g., reference objects) may be customized using an open operand stack (enabling programmability of the processor 102 to implement various artificial neural networks defined by directed acyclic graphs each providing instructions for performing various types of object detection). The CNN module 190b may be configured to perform local masking to the region with the high likelihood of matching the particular object(s) to detect the object.

In some embodiments, the CNN module 190b may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190b may be pre-trained (e.g., configured to perform computer vision to detect objects based on the training data received to train the CNN module 190b).

For example, the results of training data (e.g., a machine learning model) may be pre-programmed and/or loaded into the processor 102. The CNN module 190b may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190b may be varied according to the design criteria of a particular implementation.

The CNN module 190b may implement the feature extraction and/or object detection by performing convolution operations. The convolution operations may be hardware accelerated for fast (e.g., real-time) calculations that may be performed while consuming low power. In some embodiments, the convolution operations performed by the CNN module 190b may be utilized for performing the computer vision operations. In some embodiments, the convolution operations performed by the CNN module 190b may be utilized for any functions performed by the processor 102 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

One or more of the hardware modules 190a-190n may be configured to implement other types of AI models. In one example, the hardware modules 190a-190n may be configured to implement an image-to-text AI model and/or a video-to-text AI model. In another example, the hardware modules 190a-190n may be configured to implement a Large Language Model (LLM). Implementing the AI model(s) using the hardware modules 190a-190n may provide AI acceleration that may enable complex AI tasks to be performed on an edge device such as the edge devices 100a-100n.

One of the hardware modules 190a-190n may be configured to perform the virtual aperture imaging. One of the hardware modules 190a-190n may be configured to perform transformation operations (e.g., FFT, DCT, DFT, etc.). The number, type and/or operations performed by the hardware modules 190a-190n may be varied according to the design criteria of a particular implementation.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogeneous processing resources (all circuits 190a-190n may have the same capabilities) or heterogeneous processing resources (two or more circuits 190a-190n may have different capabilities).

Figure 4:
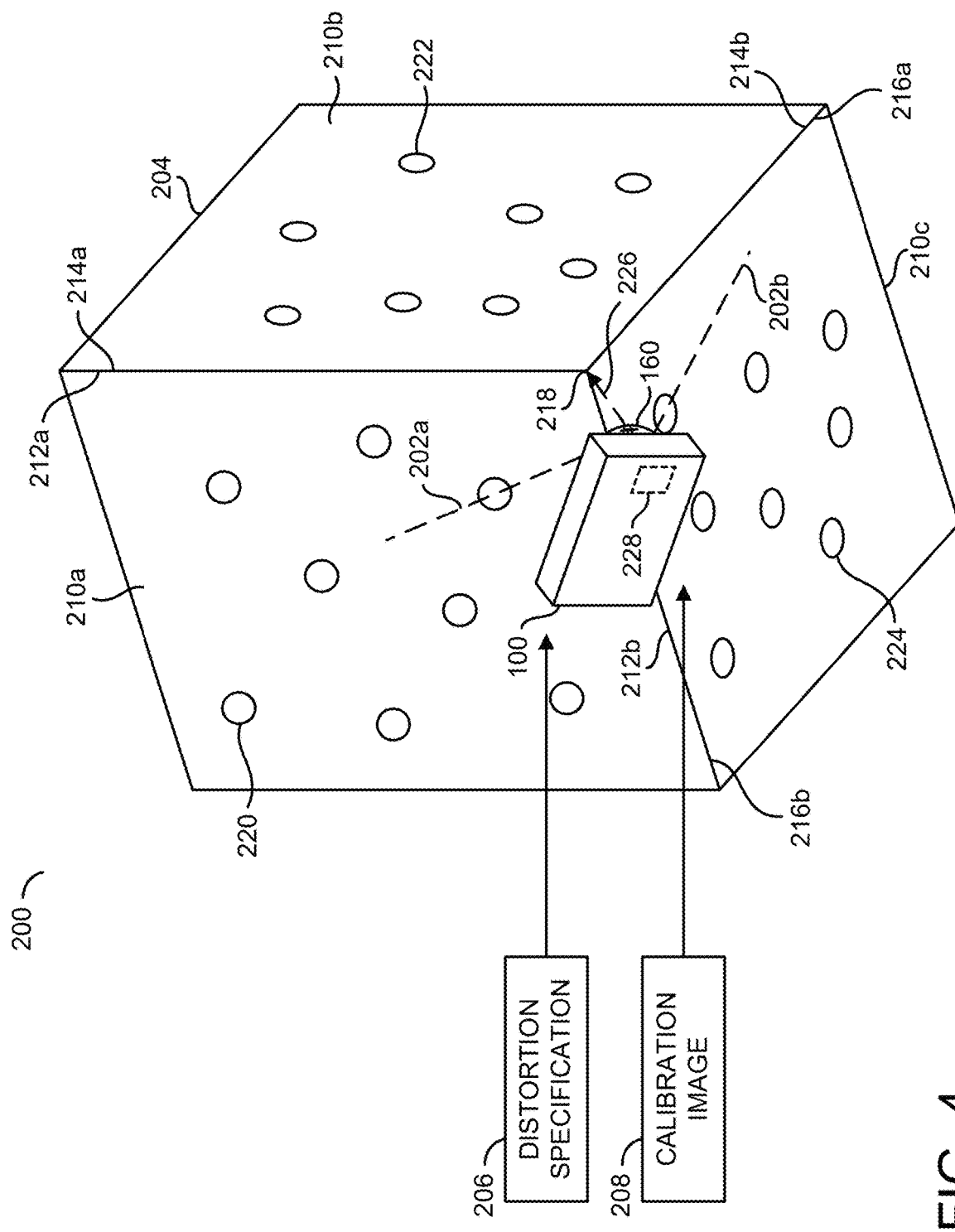
FIG. 4 is a diagram illustrating an image capture of a calibration scene.

Referring to FIG. 4, a diagram illustrating an image capture of a calibration scene is shown. A calibration configuration 200 is shown. The calibration configuration 200 may provide an illustrative example of the capture of the single calibration image. The calibration configuration 200 may be performed during a manufacturing time of the camera systems 100a-100n. For example, during manufacture of the camera systems 100a-100n (e.g., as part of an assembly line and/or other manufacturing process), each of the camera systems 100a-100n may be calibrated in a scenario similar to the calibration configuration 200.

The calibration configuration 200 may comprise the camera system 100. The camera system 100 may be a representative example of one of the camera systems 100a-100n. The camera system 100 may comprise the wide angle lens 160. For example, the wide angle lens 160 may be a fisheye lens. The fisheye lens 160 may have a convex shape. The convex shape of the fisheye lens 160 may extend outwards from a body of the camera system 100. In the example shown, the fisheye lens 160 may be attached directly to the body of the camera system 100 (e.g., similar to a point-and-shoot style camera and/or a ceiling mounted style camera). In some embodiments, the fisheye lens 160 may be implemented at the end of a lens barrel. The body type of the camera system 100 and/or the attachment of the fisheye lens 160 to the camera system 100 may be varied according to the design criteria of a particular implementation.

Dashed lines 202a-202b are shown extending from the fisheye lens 160. The dashed lines 202a-202b may represent a field of view of the lens 160. For example, the environment within the field of view 202a-202b may be captured in the video frames (e.g., the signal VIDEO). The field of view 202a-202b may be a wide angle field of view (or an ultra-wide angle field of view). In one example, the field of view 202a-202b may be at least 100°. In another example, the field of view 202a-202b may be approximately 280°. In yet another example, the field of view 202a-202b may be between 180°-230°. The particular size of the field of view 202a-202b of the fisheye lens 160 may be varied according to the design criteria of a particular implementation.

An object 204 is shown within the field of view 202a-202b. The object 204 may be configured as a calibration scene (or calibration target). The calibration scene 204 may be configured to provide the camera 100 a reference image. Generally, the camera system 100 may be located relatively close to the calibration scene 204 (e.g., within a space defined by the edges of the calibration scene 204) while capturing the reference image, as shown. The reference image may be used to enable the processor 102 to calculate the distortion curve. The camera system 100 may be configured to capture a single image of the calibration scene 204. The single image of the calibration scene 204 may enable the processor 102 to perform a series of operations comprising the lens calibration.

The calibration configuration 200 may comprise a block 206 and a block 208. The block 206 may comprise a distortion specification. The block 208 may comprise a calibration image. The processor 102 may be configured to determine the distortion curve in response to the distortion specification 206 and the calibration image 208. The calibration image 208 may comprise a video frame captured of the calibration scene 204. For example, the calibration image 208 may comprise the single video (or image) frame used by the processor 102 to perform the lens calibration. Details of the calibration image 208 may be described in association with FIG. 5.

The distortion specification 206 may comprise a lens distortion correction. The lens distortion correction in the distortion specification 206 may comprise a general transformation for the fisheye lens 160. For example, the general transformation of the distortion specification 206 for the fisheye lens 160 may provide parameters (e.g., implemented as a transform matrix) to partially correct the distortion caused by the fisheye lens 160. In one example, the distortion specification 206 may be provided by a vendor and/or manufacturer of the fisheye lens 160. The distortion specification 206 may comprise a profile created specifically for a particular model of lens, which may comprise a distortion type (e.g., barrel, pincushion, etc.), distortion parameters (e.g., based on factors such as an image sensor surface area, an output resolution, a focal length, particular angles, etc.), etc. The distortion specification 206 may be stored in the memory 150. In some embodiments, the distortion specification 206 may be stored as a lookup table in the memory 150. The particular parameters and/or the format of the distortion specification 206 may be varied according to the design criteria of a particular implementation.

The distortion specification 206 may provide a default value(s) for a particular model of the fisheye lens 160. However, the distortion specification 206 may not account for particular intrinsic parameters of the fisheye lens 160. For example, each fisheye lens 160 may comprise variations and/or imperfections that may not be accounted for by the distortion specification 206. In an example, the distortion specification 206 may provide a good distortion correction for a particular make/model of lens, but without accounting for the intrinsic parameters unique to the fisheye lens 160, the distortion specification 206 may not be highly accurate. The calibration operations performed by the processor 102 may be configured to determine the distortion curve that may provide the highly accurate distortion correction. For example, the highly accurate distortion correction may enable the correction of the unique variations of a particular lens. The calibration image 208 may enable the processor 102 to determine the distortion curve that may provide the distortion correction with better accuracy than the distortion specification 206.

The calibration scene 204 may be designed to provide the calibration image 208 to enable the calibration operations by the processor 102. The calibration scene 204 may comprise surfaces 210a-210c. Each of the surfaces 210a-210c may provide a plane. The three planes 210a-210c may be connected to provide a 3 dimensional shape (e.g., similar to a X-plane, Y-plane, and a Z-plane of a Cartesian coordinate system). In the example shown, the 3 dimensional shape provided by the three planes 210a-210c may be oriented as three sides of a cube, with the plane 210c as a bottom surface. In one example, the calibration scene 204 may rest on the ground with the surface 210c resting on the ground. In another example, the calibration scene 204 may be placed on a stand (not shown) with the surface 210c resting on the stand. The calibration scene 204 may be positioned at a particular location with respect to the camera system 100 to enable the calibration image 208 to meet a number of prerequisites for calibration. In one example, to capture the calibration image 208, the camera system 100 may be located within the bounds of the three sides of a cube created by the surfaces 210a-210c arranged as the calibration scene 204.

The surfaces 210a-210c may be implemented having a same size. In one example, the surfaces 210a-210c may each have a size of 53 cm×53 cm. The size of the surfaces 210a-210c may be larger than the camera system 100. Generally, when capturing the calibration scene 204, the camera system 100 may be located within the arrangement of surfaces 210a-210c. For example, to capture the calibration image 208, the field of view 202a-202b may be directed to capture the surfaces 210a-210c without capturing pixel data outside of the calibration scene 204. The particular size of the surfaces 210a-210c may be varied according to the design criteria of a particular implementation.

The surface 210a may comprise a line 212a and a line 212b. The lines 212a-212b may each be located along an edge of the surface 210a. The line 212a may be located along an edge of the surface 210a that connects to the surface 210b. The line 212b may be located along an edge of the surface 210a that connects to the surface 210c. In an example, the lines 212a-212b may be red lines.

The surface 210b may comprise a line 214a and a line 214b. The lines 214a-214b may each be located along an edge of the surface 210b. The line 214a may be located along an edge of the surface 210b that connects to the surface 210a. The line 214b may be located along an edge of the surface 210b that connects to the surface 210c. In an example, the lines 214a-214b may be red lines.

The surface 210c may comprise a line 216a and a line 216b. The lines 216a-216b may each be located along an edge of the surface 210c. The line 216a may be located along an edge of the surface 210c that connects to the surface 210b. The line 216b may be located along an edge of the surface 210c that connects to the surface 210a. In an example, the lines 216a-216b may be red lines.

The lines 212a and 214a may be aligned together to form a seam (or axis) for the calibration scene 204 that may appear as a single line in the calibration image 208. The lines 212b and 216b may be aligned together to form a seam (or axis) for the calibration scene 204 that may appear as a single line in the calibration image 208. The lines 214b and 216a may be aligned together to form a seam (or axis) for the calibration scene 204 that may appear as single line in the calibration image 208. In the example shown, the seams created by the various combinations of the lines 212a-216b may appear as a single line, however each of the lines 212a-216b may be a distinct colored line when the surfaces 210a-210c are separated. Each of the seams formed by the lines 212a-216b may meet at a point 218. For example, the point 218 may be an origin point. For example, each of the seams created by the lines 212a-216b may extend from the origin point 218 similar to axes of a Cartesian coordinate system. For example, the lines 212a-216b may separate the area of the three planes 210a-210c. In one example, the lines 212a-216b may be a red color. In another example, the lines 212a-216b may be a black color. In yet another example, the lines 212a-216b may be a yellow color. The particular color of the lines 212a-216b may depend on other colors used in the calibration scene 204, the characteristics of the lens 160 and/or may be varied according to the design criteria of a particular implementation.

The surface 210a may comprise a dot pattern 220. The surface 210b may comprise a dot pattern 222. The surface 210c may comprise a dot pattern 224. For example, each of the surfaces 210a-210c may comprise a line and a dot pattern. The dot patterns 220-224 may comprise a number of dots (or small circles) having at least two different colors. In one example, the color of the dots of the dot patterns 220-224 may be red dots and black dots. In some embodiments, the color of the dots of the dot patterns 220-224 may be selected based on the color used for the lines 212a-216b (e.g., the lines 212a-216b may be a red color while the dot patterns 220-224 may comprise red dots and black dots). The dot patterns 220-224 are shown as illustrative examples. For example, the dots of the dot patterns 220-224 may be of varying sizes, colors and/or locations. Each of the dot patterns 220-224 may be similar on each of the surfaces 210a-210c.

The calibration configuration 200 may be set up manually by a person. For example, the person may be an engineer and/or an assembly line worker. The calibration scene 204 may be set up in a particular configuration to enable the processor 102 to perform the calibration operations. The calibration scene 204 may be set up to be captured by the field of view 202a-202b with the corners of the three planes 210a-210c (e.g., the origin point 218) at (or near) the image center (e.g., the center of the field of view 202a-202b in the resulting calibration image 208 captured). In the example shown, the field of view 202a-202b may capture the entirety of the calibration scene 204. For example, an arrow 226 is shown illustrating the field of view 202a-202b being directed towards the origin point 218. Generally, the camera system 100 may be set up inside the calibration scene 204 (e.g., such that the field of view 202a-202b does not capture a view outside of the calibration scene 204 and is filled with the dot patterns 220-224). The calibration configuration 200 may be acceptable for the calibration operations when the lines 212a-216b divide the calibration image 208 into three equal portions with the seam formed by the line 212a and 214a being vertical. After the camera system 100 captures the calibration image 208, the processor 102 may detect the positions of the dots in the dot patterns 220-224 and/or perform a sequence of calculations to determine an optical center and the distortion curve.

The camera system 100 is shown comprising a block (or circuit) 228. The block 228 may implement the distortion curve. In one example, the distortion curve 228 may be stored in the memory 150 of the camera system 100. The distortion curve 228 may be determined in response to the distortion specification 206, the calibration image 208 and/or the calibration operations performed by the processor 102 based on the calibration scene 204. The distortion curve 228 may be an output result of the calibration operations performed using the single calibration image 208. The distortion curve 228 may be configured to provide a transformation that the processor 102 may apply to video frames captured by the capture device 104 using the wide angle lens 160. The transformation provided by the distortion curve 228 may be configured to correct a distortion caused by the characteristics of the fisheye lens 160. For example, the processor 102 may process the pixel data generated by the capture device 104 as video frames. The distortion curve 228 may be applied to the video frames to correct the distortion caused by the fisheye lens 160. In an example, the distortion curve 228 may provide a corrected perspective (e.g., rectilinear field of view) in response to applying the transformation of the distortion curve 228 to the distorted video frames.

Figure 5:
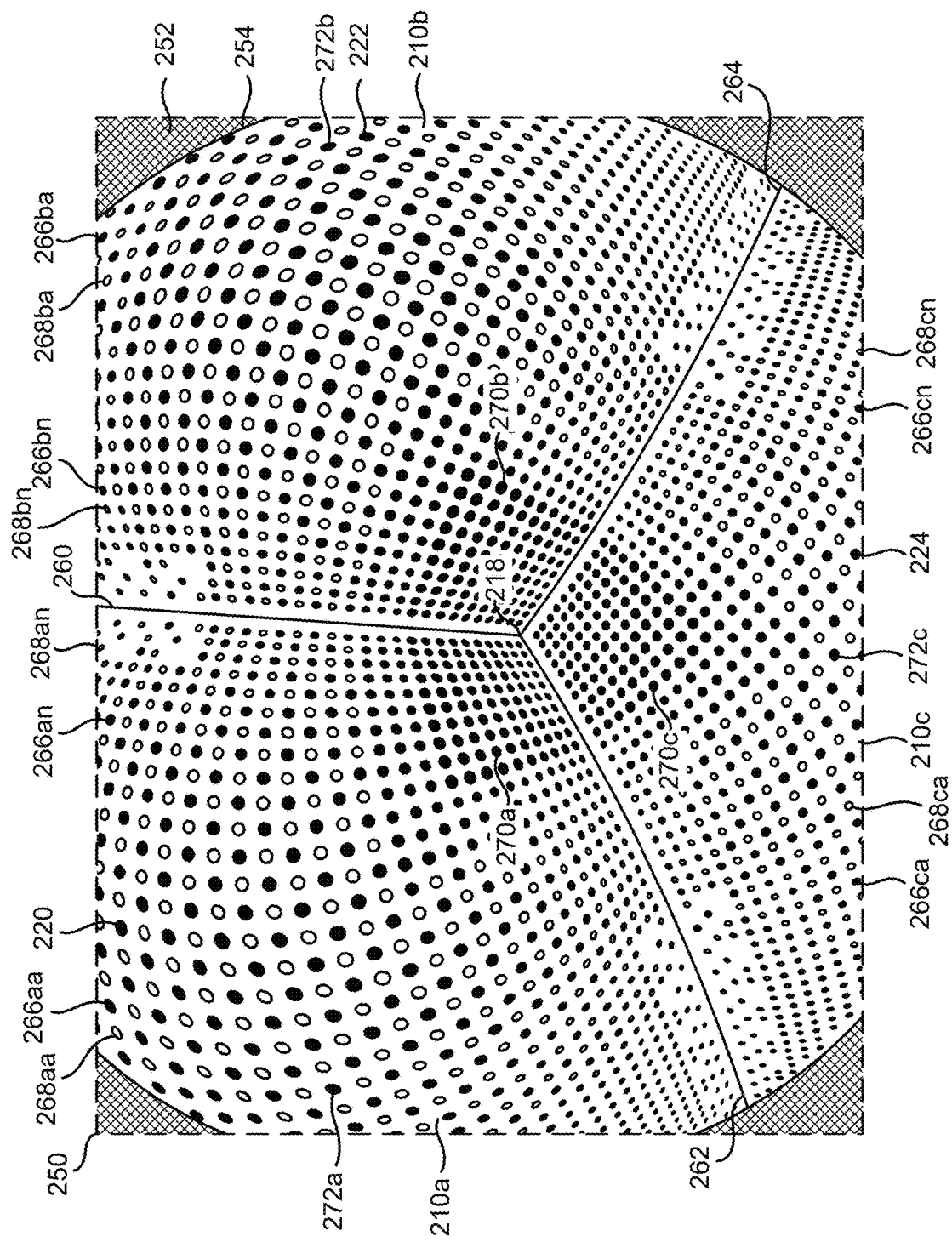
FIG. 5 is a diagram illustrating an example raw image of a calibration scene.

Referring to FIG. 5, a diagram illustrating an example raw image of a calibration scene is shown. A raw image 250 is shown. The raw image 250 may be the calibration image 208 captured by the camera system 100. The raw image 250 may comprise visual data of the calibration scene 204. The calibration scene 204 may be captured in the raw image 250 according to the prerequisites of the calibration configuration 200 described in association with FIG. 4.

The raw image 250 may comprise pixel data captured by the capture device 104. In one example, the raw image 250 may be provided to the processor 102 as the signal VIDEO. In another example, the raw image 250 may be generated by the processor 102 in response to the pixel data provided in the signal VIDEO. The pixel data of the raw image 250 received by the processor 102 may correspond to pixel data captured of the field of view 202a-202b. In some embodiments, the raw image 250 may be pre-processed by the processor 102. In some embodiments, the raw image 250 may be presented as human viewable video output to one or more video displays. In some embodiments, the raw image 250 may be utilized internal to the processor 102 to perform the computer vision operations. For example, the raw image 250 may be analyzed by the CNN 190b.

The raw image 250 may comprise a distortion 252 and/or an image circle 254. The distortion 252 may cause the image frame to appear circular (e.g., an example image size 1920× 960 may have empty space in the corners). The image circle 254 may be circumscribed within a rectangular shape of the video frame of the raw image 250. The image circle 254 may represent the viewable area captured by the field of view 202a-202b. The image circle 254 may comprise a cross-section of a cone of light transmitted through the fisheye lens 160 onto the image sensor 180. For example, the image circle 254 may represent an upper limit of the image sensor 180 that the fisheye lens 160 may cover with an acceptable image.

The raw image 250 may comprise pixel data that captures the calibration scene 204. The plane 210a, the plane 210b and the plane 210c may be captured by the raw image 250. The dot pattern 220 is shown on the plane 210a, the dot pattern 222 is shown on the plane 210b and the dot pattern 224 is shown on the plane 210c. The origin point 218 is shown where the planes 210a-210c meet. Since the camera system 100 may be within the bounds of the calibration scene 204, the raw image 250 may not comprise pixel data of an area outside of the calibration scene 204 (e.g., the dot patterns 220-224 may extend to the edge of the image circle 254).

A line 260 is shown extending upwards from the origin point 218. The line 260 may be a seam (or axis) comprising the line 212a from the plane 210a and the line 214a from the plane 210b (shown in association with FIG. 4). A line 262 is shown extending to the left edge of the raw image 250 from the origin point 218. The line 262 may be a seam (or axis) comprising the line 212b from the plane 210a and the line 216b from the plane 210c (shown in association with FIG. 4). A line 264 is shown extending to the right edge of the raw image 250 from the origin point 218. The line 264 may be a seam (or axis) comprising the line 214b from the plane 210b and the line 216a from the plane 210c (shown in association with FIG. 4). The raw image 250 may be captured to be acceptable for the calibration operations. For example, the seams 260-264 may divide the raw image 250 into three equal portions and the seam 260 may be vertical. Generally, to provide the three equal portions for the surfaces 210a-210c, the origin point 218 may be at (or near) the center of the raw image 250.

The dot pattern 220 of the surface 210a may comprise a number of dots 266aa-266an and a number of dots 268aa-268an. The dot pattern 222 of the surface 210b may comprise a number of dots 266ba-266bn and a number of dots 268ba-268bn. The dot pattern 224 of the surface 210c may comprise a number of dots 266ca-266cn and a number of dots 268ca-268cn. Each of the dots 266aa-266cn may be one color and each of the dots 268aa-268cn may be another color. In one example, the dots 266aa-266cn may be black dots and the dots 268aa-268cn may be red dots. Generally, the dots 266aa-266cn and the dots 268aa-268cn may be in an alternating pattern (e.g., each dot may have dots of the different color as adjacent dots) for most of the planes 210a-210c. Other colors may be used for the dots 266aa-266cn and the dots 268aa-268cn (e.g., blue and green, yellow and purple, orange and brown, etc.). The alternating color of the dots 266aa-266cn and the dots 268aa-268cn may be used to check a correctness of the dot order. For example, when mapping the dots (e.g., as described in association with FIG. 9), if all dots are the same color, the mapping may not be made to the correct corresponding dot. The particular colors, sizes and/or distance settings of the dots 266aa-266cn and the dots 268aa-268cn may be selected based on the characteristic of the fisheye lens 160 distortion. The particular colors of the dots 266aa-266cn and the dots 268aa-268cn may be varied according to the design criteria of a particular implementation.

From the perspective shown in the raw image 250, a group of the dots 266aa-266an (e.g., bigger dots 270a) may be clustered at a bottom right of the plane 210a, a group of the dots 266ba-266bn (e.g., bigger dots 270b) may be clustered near a bottom left of the plane 210b and a group of the dots 266ca-266cn (e.g., bigger dots 270c) may be clustered near a top corner of the plane 210c. For example, if the dots 266aa-266cn are black dots than the calibration scene 204 captured in the raw image 250 may comprise a grouping of black dots as the bigger dots 270a-270c around the origin point 218 and then the dot patterns 220-224 may transition to the alternating pattern of the dots 266aa-266cn and the dots 268aa-268cn after a pre-determined distance from the origin point 218.

The alternating pattern of dots 266aa-266an and the dots 268aa-268an on the surface 210a located farther from the origin point 218 may be smaller dots 272a. The alternating pattern of dots 266ba-266bn and the dots 268ba-268an on the surface 210b located farther from the origin point 218 may be smaller dots 272b. The alternating pattern of dots 266ca-266cn and the dots 268ca-268cn on the surface 210c located farther from the origin point 218 may be smaller dots 272c. From the perspective of the lens 160, the origin point 218 may be farther away than the rest of the locations on the surfaces 210a-210c. Since the bigger dots 270a-270c may be clustered near the origin point 218, and the smaller dots 272a-272c may be located farther away from the origin point 218, the bigger dots 270a-270c may be farther away from the camera lens 160 than the smaller dots 272a-272c. The bigger dots 270a-270c may have a larger size than the smaller dots 272a-272c. The difference in size between the bigger dots 270a-270c and the smaller dots 272a-272c may enable the processor 102 to identify and/or distinguish the particular dots (e.g., for mapping). The particular sizes of the bigger dots 270a-270c compared to the smaller dots 272a-272c may be varied according to the design criteria of a particular implementation.

The processor 102 may be configured to perform computer vision operations and/or detection operations to detect a center of each of the dots 266aa-266cn and each of the dots 268aa-268cn. In one example, a video processing pipeline of the processor 102 may comprise an iDSP (e.g., the IDSP 158). The processor 102 may be configured to determine coordinates in 3D space of the center of each of the dots 266aa-266cn and the dots 268aa-268cn. However, due to the distortion caused by the fisheye lens 160, the processor 102 may not directly detect the center of the dots 266aa-266cn and the dots 268aa-268cn. For example, the planes 210a-210c may not be parallel, resulting in the dots 266aa-266cn and the dots 268aa-268cn appearing as imperfect circles that appear elliptical. The lens 160 may further affect the ellipse shape, resulting in an atypical ellipse shape. The processor 102 may be configured to perform a number of detection operations to obtain accurate results for the location of the dots 266aa-266cn and the dots 268aa-268cn.

The detection operations performed by the processor 102 may comprise detecting centers of the dots 266aa-266cn and the dots 268aa-268cn and then applying the distortion specification 206 to the raw image 250. Applying the distortion specification 206 may partially correct the raw image 250 (e.g., partially compensate for the distortion of the lens 160). The processor 102 may further perform a perspective transform (e.g., based on a least squares method) that may transform the ellipse shape of the dots 266aa-266cn and the dots 268aa-268cn into circles. The processor 102 may then perform a center-finding vision operation on the corrected (e.g., circular) shape of the dots 266aa-266cn and the dots 268aa-268cn. After determining the center location for each of the dots 266aa-266cn and the dots 268aa-268cn, the processor 102 may convert the perspective corrected image back to a domain of the raw image 250. For example, the processor 102 may convert back to the domain of the raw image 250 by applying an inverse of the perspective correction and an inverse of the distortion specification 206. Determining the center-finding vision operation after applying the distortion specification 206 and the perspective correction and then converting back to the domain of the raw image 250 may ensure high accuracy for the center location results of the dots 266*aa*-266*cn* and the dots 268*aa*-268*cn*. The center locations of the dots 266*aa*-266*cn* and the dots 268*aa*-268*cn* may be raw image points used by the processor 102 for the calibration operations. The center locations of the dots 266*aa*-266*cn* and the dots 268*aa*-268*cn* (e.g., the raw image points) may be used to determine the optical center and/or the distortion curve 228.

Figure 6:
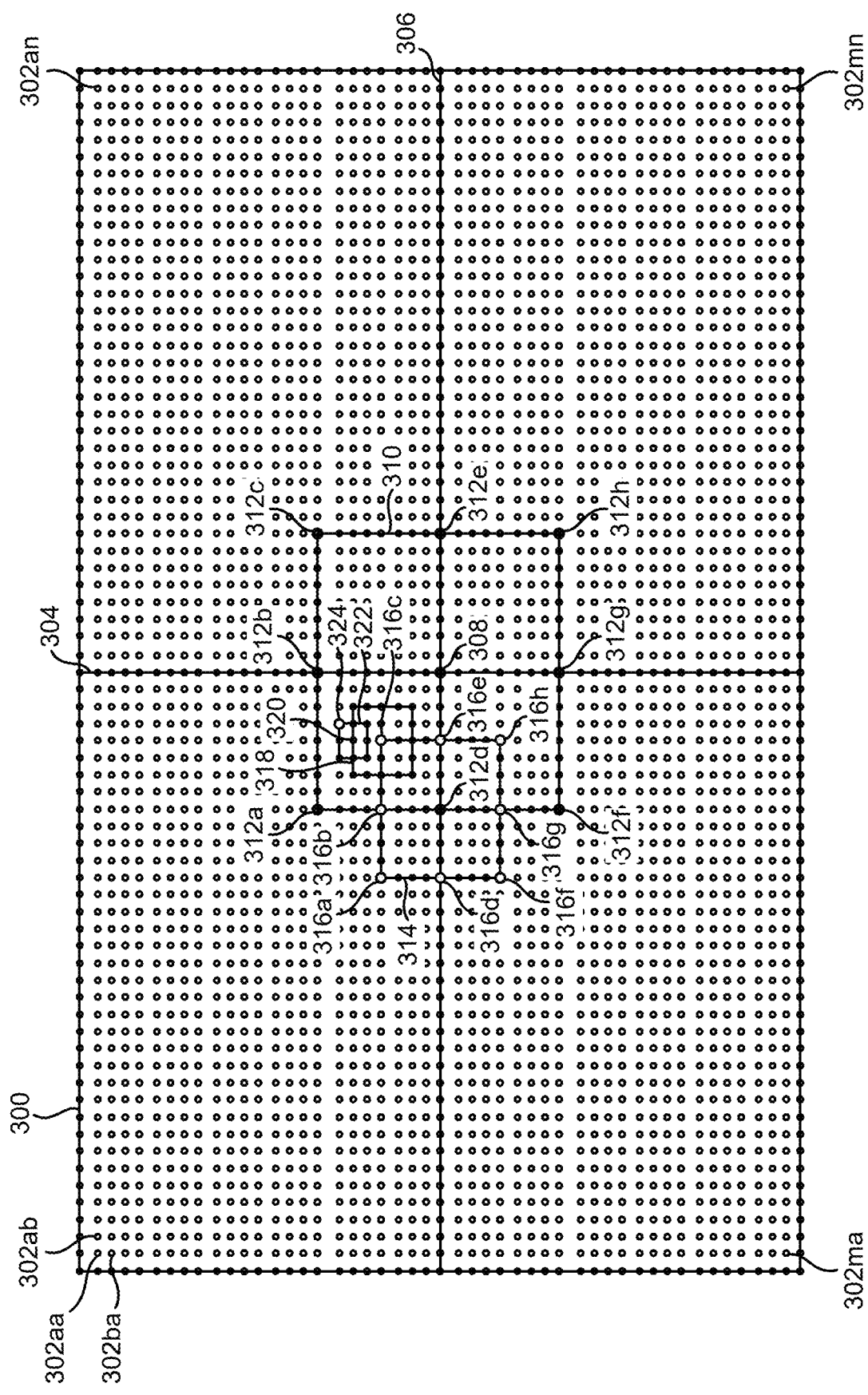
FIG. 6 is a diagram illustrating an optical center test table for calculating an optical center.

Referring to FIG. 6, a diagram illustrating an optical center test table for calculating an optical center is shown. An optical center test table 300 is shown. The optical center test table 300 may be used by the processor 102 to perform a straightness scoring system. The straightness scoring system may enable the processor 102 to determine the optical center of the lens 160.

The optical center of the lens 160 may be a point where light rays (e.g., the input LIN) pass through the lens 160 without deviation. The optical center of the lens 160 may be a reference point. In the example of a symmetric lens, the optical center may be at a geometric center of a lens. For the fisheye lens 160, the optical center may be generally located near a center of an image circle. The image circle may be brightest in the center and decreases in brightness and quality towards the edges. A size of the image circle may determine a usable field angle of the lens 160.

The distortion caused by the fisheye lens 160 may be radially symmetric around the optical center. For example, straight lines (e.g., the seams 260-264 of the calibration scene 204) may appear curved in the raw image 250, with the curvature increasing towards the edges of the raw image 250. Generally, the optical center may be an important reference point for fisheye images, since the optical center may be a point of least distortion.

For the calibration operations, the optical center may be one of the intrinsic parameters of the camera system 100. The optical center coordinates may represent where an optical axis intersects with an image plane. The optical center for the fisheye lens 160 may not always coincide with the physical center of the lens 160 and/or the image sensor 180.

The processor 102 may use the detection of the center locations of the dots 266*aa*-266*cn* and the dots 268*aa*-268*cn* to implement the scoring system to determine the optical center. An optical center may be assumed and then the distortion specification 206 may be applied in order to compute a straightness score. The processor 102 may search with in a range of optical center scores to determine an accurate result for the optical center.

The optical center test table 300 may comprise a number of pixel locations 302*aa*-302*mn*. The optical center test table 300 may be a virtual table. The pixel locations 302*aa*-302*mn* may correspond to the pixels of the calibration image 208. For example, an image size captured by the image sensor 180 may be 1920×960. Since the resolution of the image may comprise more pixels in width than for height, there may be more columns than rows for the pixel locations 302*a*-302*mn*. The processor 102 may apply the distortion specification 206. The distortion specification 206 may result in the pixel locations 302*aa*-302*mn* appearing relatively straight on the optical center test table 300.

A vertical line 304 and a horizontal line 306 are shown. The vertical line 304 and the horizontal line 306 may be reference lines. The vertical line 304 may be at a middle of the width of the optical center test table 300. The horizontal line 306 may be at a middle of the height of the optical center test table 300. The vertical line 304 and the horizontal line 306 may intersect at a point 308. The point 308 may be a center pixel of the optical center test table 300.

The processor 102 may determine a straightness score by applying an optical center point and determining a straightness of the result based on the optical center point. Multiple pixels may be used as optical center test points for determining the straightness score. For a first test point, the optical center point may be assumed to be a center point (e.g., the image center). For example, an initial optical center point calculation may be at the point 308. A 3×3 optical center test table may be analyzed. The 3×3 optical center test table may be determined according to a width setting. The width setting may be a user defined value in pixels for a search range for the optical center. In one example, the width setting may be 50 pixels. The width setting may be set based on a resolution of the input images. For example, a larger width setting may result in more iterations (e.g., more time and computational costs) to determine the optical center. However, a lower width setting may not detect the optical center (e.g., the optical center may be out of range). The particular value of the width setting may be varied according to the design criteria of a particular implementation.

A 3×3 optical center test table 310 is shown around the first test point 308. Each 3×3 optical center test table may be determined based on the width setting and a center point. The 3×3 optical center test table 310 may be selected based on the width setting using the center point as the first test point 308. The 3×3 optical center test table 310 may comprise nine pixel locations (e.g., the first test point 308 and edge points 312*a*-312*h*). For example, if the image size is 1920×960, and the width setting is 50 pixels, the image center point 308 may be pixel location (960,480), the edge point 312*a* may be pixel location (910,430), the edge point 312*b* may be pixel location (960,430), the edge point 312*c* may be pixel location (1010,430), the edge point 312*d* may be pixel location (910,480), the edge point 312*e* may be pixel location (1010,480), the edge point 312*f* may be pixel location (910,530), the edge point 312*g* may be pixel location (960,530) and the edge point 312*h* may be pixel location (1010,530). All of the edge points 312*a*-312*h* may be a location 50 pixels (e.g., the width setting) greater than or less than the center point 308.

The processor 102 may calculate which of the center point 308 or one of the edge points 312*a*-312*h* of the 3×3 optical center test table 310 has a lowest straightness error. For example, the processor 102 may assume each of the center point 308 and the edge points 312*a*-312*h* as the optical center and then perform a straightness score calculation (e.g., nine different optical center test points may be tested and nine different straightness scores may be generated). The location on the 3×3 optical center test table 310 that has the lowest straightness error location may be used as the optical center for the next 3×3 optical center test table iteration. Details of the straightness scoring may be described in association with FIG. 7. The next iteration may use a width setting at half the size of the current iteration width setting. The processor 102 may continue the straightness scoring system by applying the 3×3 optical center test table until reaching a width setting of one (or less). The location with the lowest straightness error at the last iteration may be determined to be the optical center. In the example shown, the edge point 312*d* may be the test point from the first iteration 3×3 optical center test table 310 with the lowest error score.

A second iteration 3×3 optical center test table 314 is shown. The center location of the second iteration 3×3 optical center test table 314 may be the edge point 312*d* (e.g., the left middle dot) of the 3×3 optical center test table 310. For example, the edge point 312*d* may be the pixel location (910,480) and the width setting may be half the initial width setting (e.g., a value of 25). Using the edge point 312*d* as the center point and the second iteration 3×3 optical center test table 314 may have edge points 316*a*-316*h*. In the example shown, with a width setting of 25, the edge point 316*a* may be pixel location (885,455), the edge point 316*b* may be pixel location (910,455), the edge point 316*c* may be pixel location (935,455), the edge point 316*d* may be pixel location (885,480), the edge point 316*e* may be pixel location (935,480), the edge point 316*f* may be pixel location (885,505), the edge point 316*g* may be pixel location (910,505) and the edge point 316*h* may be pixel location (935,505). All of the edge points 312*a*-312*h* may be a location 25 pixels (e.g., the width setting) greater than or less than the center point 312*d*. The processor 102 may use each of the center point 312*d* and the edge points 316*a*-316*h* as optical center test points to determine a straightness error score. The processor 102 may determine which of the edge points 316*a*-316*h* has the lowest error score. In the example shown, the edge point 316*c* (e.g., upper right location) may have the lowest error score.

A third iteration 3×3 optical center test table 318 is shown. The center location of the third iteration 3×3 optical center test table 318 may be the edge point 316*c* (e.g., the upper right dot) of the second iteration 3×3 optical center test table 314. For example, the edge point 316*c* may be the pixel location (935,455) and the width setting may be half the second iteration width setting (e.g., a value of 13, rounded up). The third iteration 3×3 optical center test table 318 may comprise edge points at locations 13 pixels (e.g., the width setting for the third iteration) greater than or less than the center point 316*c*. The processor 102 may determine which of the edge points of the third iteration 3×3 optical center test table 318 has the lowest error score. In the example shown, the edge point 320 (e.g., upper middle location) may have the lowest error score.

A fourth iteration 3×3 optical center test table 322 is shown. The center location of the fourth iteration 3×3 optical center test table 322 may be the edge point 320 (e.g., the upper middle dot) of the third iteration 3×3 optical center test table 318. The width setting for the fourth iteration may be half the third iteration width setting (e.g., a value of 7, rounded up). The fourth iteration 3×3 optical center test table 322 may comprise edge points at locations 7 pixels (e.g., the width setting for the fourth iteration) greater than or less than the center point 320. The processor 102 may determine which of the edge points of the fourth iteration 3×3 optical center test table 320 has the lowest error score. In the example shown, the edge point 324 (e.g., upper right location) may have the lowest error score.

The processor 102 may repeat the loop of iterations of 3×3 optical center test tables until the width setting reaches a value of <1. A final result may be the pixel location with the lowest error score in the last iteration 3×3 optical center test table. For example, if the width setting is <1 for the fourth iteration 3×3 optical center test table 322, then the edge point 324 may be selected as the optical center for the lens 160. The optical center value determined may be used to determine the distortion curve 228.

Figure 7:
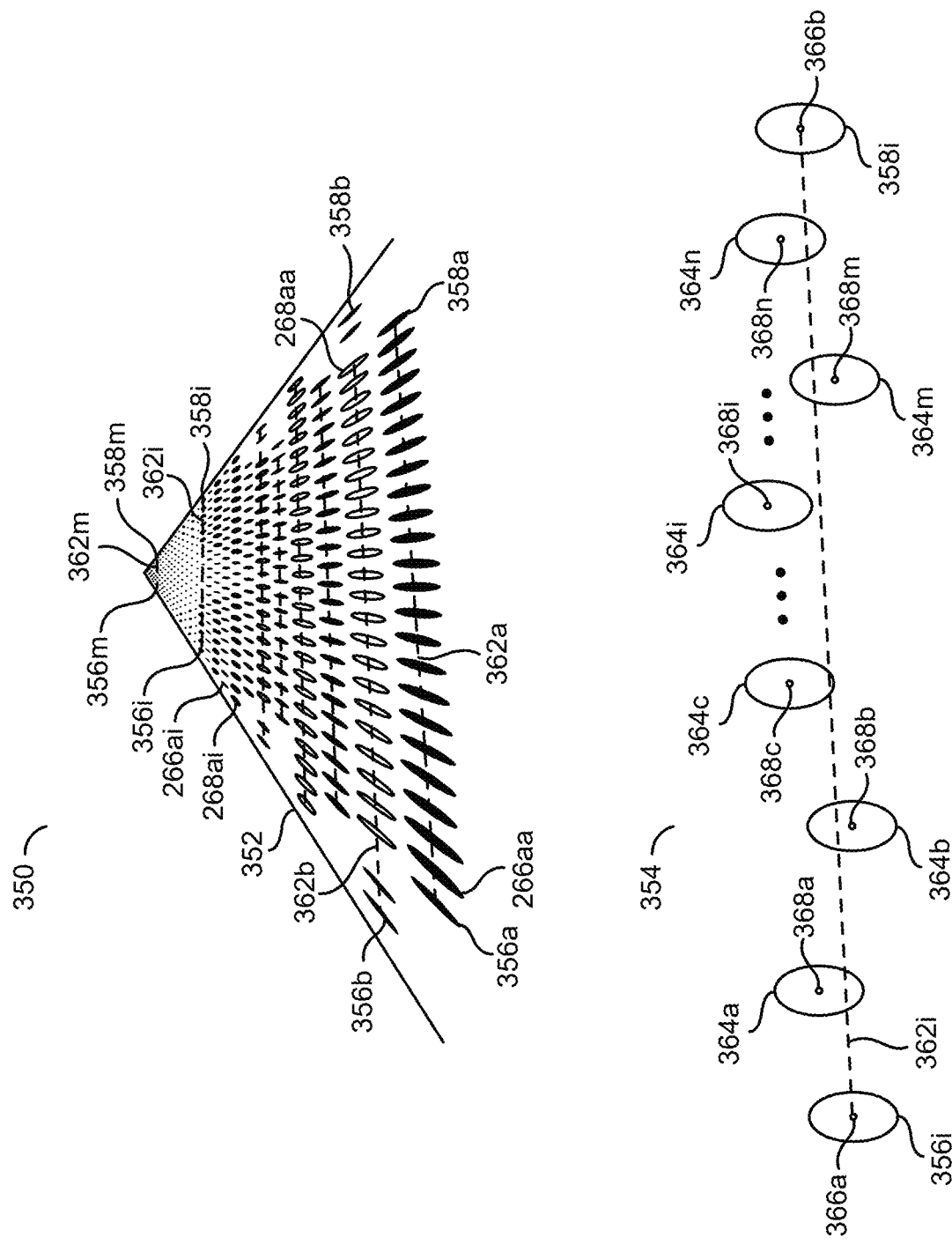
FIG. 7 is a diagram illustrating a straightness score calculation.

Referring to FIG. 7, a diagram illustrating a straightness score calculation is shown. An example straightness score calculation 350 is shown. The example straightness score calculation 350 may comprise a partially corrected plane 352 and a line score calculation 354.

The partially corrected plane 352 may provide a visual representation of one of the planes 210*a*-210*c* that has been partially corrected by applying an assumed optical center and the distortion specification 206. For simplicity, one partially corrected plane 352 showing one of the planes 210*a*-210*c* is shown instead of showing all three of the planes 210*a*-210*c* partially corrected using the assumed optical center and the distortion specification 206. For example, when one of the assumed optical centers and the distortion specification 206 is applied, an image may be generated similar to the example output image (e.g., to be described in association with FIG. 10). The assumed optical center used to generate the partially corrected plane 352 may be one of the pixel locations used in the 3×3 optical center test tables. In one example, for the 3×3 optical center test table 310 described in association with FIG. 6, the assumed optical center may be one of the first test point at the center location 308 and the edge points 312*a*-312*h* (e.g., one for each straightness score calculation). For example, the first test used as the assumed optical center may be the center point 308 to generate the partially corrected plane 352 and straightness scores may be calculated, then the edge point 312*a* may be the next assumed optical center to generate a slightly different version of the partially corrected plane 352 and straightness scores may be calculated, then the edge point 312*b* may be the next assumed optical center to generate another slightly different version of the partially corrected plane 352, etc.

The partially corrected plane 352 may comprise rows of the dots 266*aa*-266*an* and rows of the dots 268*aa*-268*an*. From the perspective of the partially corrected plane 352 shown, the first row may be a row comprising some of the dots 266*aa*-266*an*, the second row may be a row comprising some of the dots 268*aa*-268*an*, the third row may be a row comprising some of the dots 266*aa*-266*an*, the fourth row may be a row comprising some of the dots 268*aa*-268*an*, etc. Each of the rows of dots may comprise a respective first dot 356*a*-356*m* and a respective last dot 358*a*-358*m*. In the example shown, the first dot 356*a* may be the leftmost dot of the first row and the last dot 358*a* may be the rightmost dot of the first row, the first dot 356*b* may be the leftmost dot of the second row and the last dot 358*b* may be the rightmost dot of the second row, etc. Whether the first dots 356*a*-356*m* are the leftmost dot or rightmost dot (or another orientation) may be varied according to the design criteria of a particular implementation.

Lines 362*a*-362*m* are shown. Each of the lines 362*a*-362*m* may connect the respective first dots 356*a*-356*m* to the respective last dots 358*a*-358*m*. The processor 102 may calculate the lines 362*a*-362*m* as a line equation. For example, the first row line 362*a* may be a line equation corresponding to the connection of the first dot 356*a* to the last dot 358*a*, the second row line 362*b* may be a line equation corresponding to the connection of the first dot 356*b* to the last dot 358*b*, etc. A straight line score may be calculated by the processor 102 for each of the lines 362*a*-362*n*.

The line score calculation 354 may comprise an illustrative representation of the straight line score calculation for the line 362*i*. Similar calculations may be performed for each of the line equations 362*a*-362*n*. The line score calculation 354 may comprise the first dot 356*i* and the last dot 358*i* and the other offset dots 364*a*-364*n* for the row of dots in between the first dot 356*i* and the last dot 358*i*. A dot center 366*a* for the first dot 356*i* and a dot center 366*b* for the last dot 358*i* is shown. The line 362*i* may be a connection from the dot center 366*a* (e.g., of the first dot 356*i*) and the dot center 366*b* (e.g., of the last dot 358*i*). Offset dot centers 368*a*-368*n* are shown for each of the other offset dots 364*a*-364*n*. The offset dot centers 368*a*-368*n* may not necessarily be located on the line 362*i*. For example, due to the incorrectness of the particular optical center, there may be a distance between one or more of the offset dot centers 368*a*-368*n* for each of the other offset dots 364*a*-364*n*. In the example shown, some of the offset dot centers 368*a*-368*n* may be above or below the line 362*i* as an illustrative example. In some embodiments, all of the offset dot centers 368*a*-368*n* may be on one side of the line 362*i* or the other side of the line 362*i*.

The processor 102 may be configured to calculate the distance from each of the offset dot centers 368*a*-368*n* to the line 362*i*. The maximum distance of the offset dot centers 368*a*-368*n* to the line 362*i* may be the error score (e.g., a straightness error score). In the example shown, the largest distance may be the distance from the offset dot center 368*i* to the line 362*i*. Similarly, the straightness error score for each of the lines 362*a*-362*m* may be calculated. The processor 102 may sum the straightness error score for each of the lines 362*a*-362*m* to determine the total score for the straight line score for the particular assumed optical center.

The processor 102 may repeat the straightness error score calculations for each of the assumed optical centers (e.g., the first test point 308 and edge points 312*a*-312*h*). For example, the operations may be repeated nine times to generate nine different straight line scores. The lowest value of the straight line score may be the best available optical center for the iteration. In the example shown in association with FIG. 6, the lowest score may have been associated with the assumed optical center of the edge point 312*d*. Similar calculations may be performed for the next iterations (e.g., the second iteration 3×3 optical center test table 314, the third iteration 3×3 optical center test table 318, etc.).

Figure 8:
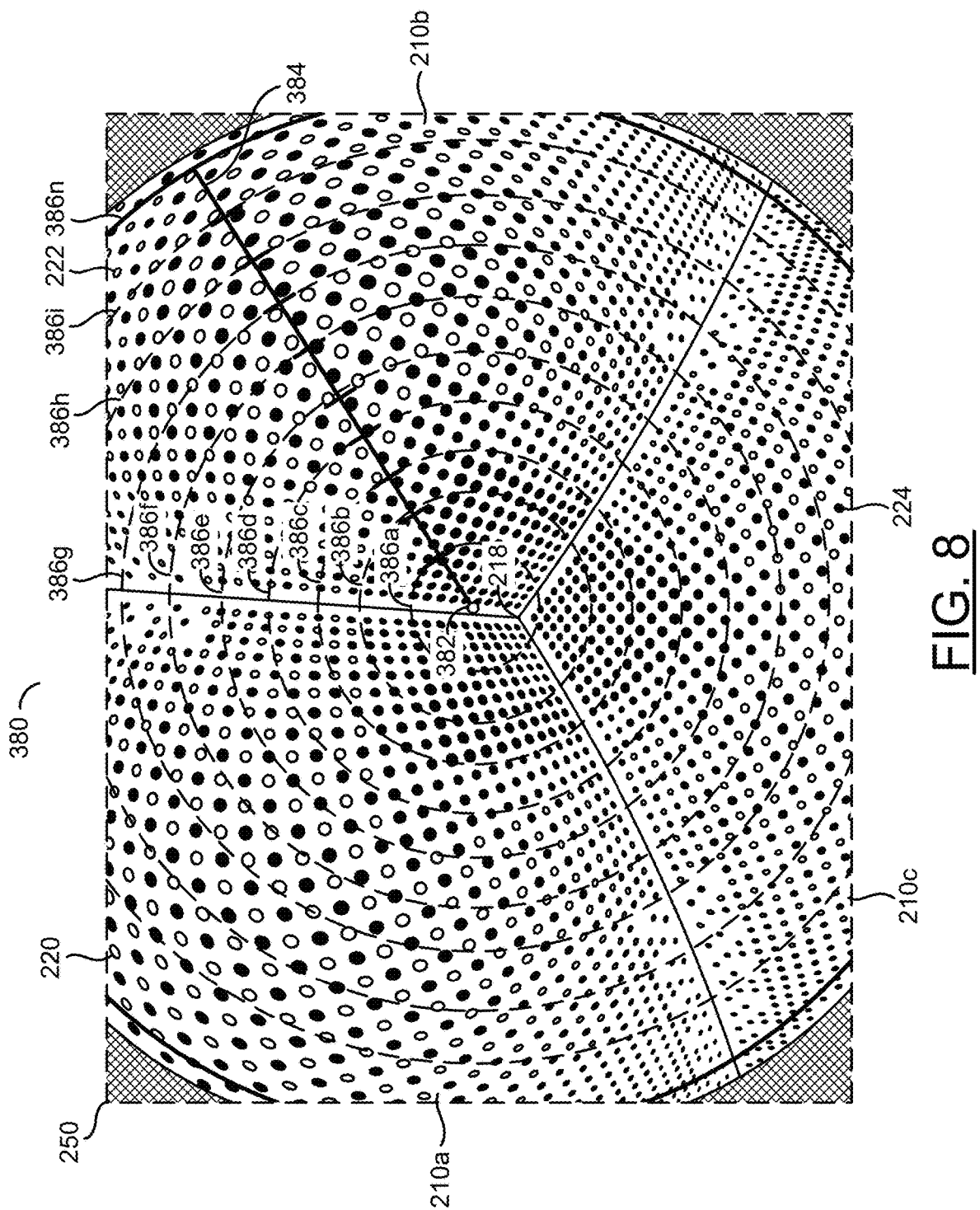
FIG. 8 is a diagram illustrating segmentation to enable a polynomial fitting based on multiple lens segment characteristics.

Referring to FIG. 8, a diagram illustrating segmentation to enable a polynomial fitting based on multiple lens segment characteristics is shown. A segmentation example 380 is shown. The segmentation example 380 may comprise the raw image 250. The raw image 250 may comprise the planes 210*a*-210*c* and the respective dot patterns 220-224 and the origin point 218 of the calibration scene 204 are shown in the raw image 250.

A point 382 is shown. The point 382 may be the optical center of the lens 160. The optical center 382 may be a different location than the image center (e.g., the origin point 218). The optical center 382 may be determined by the processor 102 by performing the straightness scoring system as described in association with FIGS. 6-7. In an example, the optical center 382 may be stored in the memory 150.

A line 384 is shown. The line 384 may extend from the optical center 382 to an edge of the image circle 254. The line 384 may be a reference line for illustrating a distance from the optical center 382. The reference line 384 may comprise distance markings. In the example shown, the reference line 384 may provide ten of the distance markings. For example, the distance markings may comprise a distance in radius from the optical center 382.

Dashed circles 386*a*-386*n* are shown. The dashed circles 386*a*-386*n* may correspond to the distance markings on the reference line 384. Each of the dashed circles 386*a*-386*n* may represent a segment. For example, one segment may be within the area of the lens 160 from the optical center 382 to the edge of the dashed circle 386*a*. In another example, another segment may be an area of the lens 160 from the segment 386*a* to the edge of the dashed circle 386*b*. In yet another example, another segment may be an area of the lens 160 from the segment 386*b* to the edge of the dashed circle 386*c*. An outer segment may be an area of the lens from the dashed circle 386*i* to a circle 386*n*. In the example, the lens 160 may be divided into 10 distance segments for performing a polynomial fit. The particular size of the segments 386*a*-386*n* may depend on the size of the lens 160, the location of the optical center 382 and/or may be varied according to the design criteria of a particular implementation.

The processor 102 may be configured to determine a polynomial fit for the calibration operations. Generally, regions with larger distortion may have a greater amount of error. To provide accurate results, the distortion curve 228 may be calculated to compensate for the different amounts of error in the different regions. For example, if only one section of the lens 160 is used as the basis for the polynomial fit, the polynomial fit may incorporate a greater amount of error data, which may provide poor compensation results (e.g., the compensation may be overfitted for some sections of the lens 160 and underfitted for other sections of the lens 160). By separating the lens 160 into the segments 386*a*-386*n*, the calibration operations may calculate the distortion curve 228 based on the various characteristics of each of the segments 386*a*-386*n*. Segmenting the polynomial fit may provide greater flexibility to adapt to local variations in the data (e.g., based on local variations of the intrinsic characteristics of the lens 160), which may prevent overfitting and/or underfitting.

In the example shown, the lens 160 may be segmented into 10 of the segments 386*a*-386*n*. In some embodiments, more of the segments 386*a*-386*n* may be implemented. In some embodiments, fewer of the segments 386*a*-386*n* may be implemented. For example, implementing more of the segments 386*a*-386*n* may provide a greater amount of accuracy and/or provide a greater amount of granularity for compensating for local variations of the fisheye lens 160 using the distortion curve 228. However, implementing more of the segments 386*a*-386*n* may add to a computation time and/or utilize more computational resources to calculate the distortion curve 228. The number of the segments 386*a*-386*n* selected may be a tradeoff between accuracy of the polynomial fit determined and computational resources (e.g., total computation time, power consumption, heat generated, etc.). The number of the segments 386*a*-386*n* selected may be varied according to the design criteria of a particular implementation.

Figure 9:
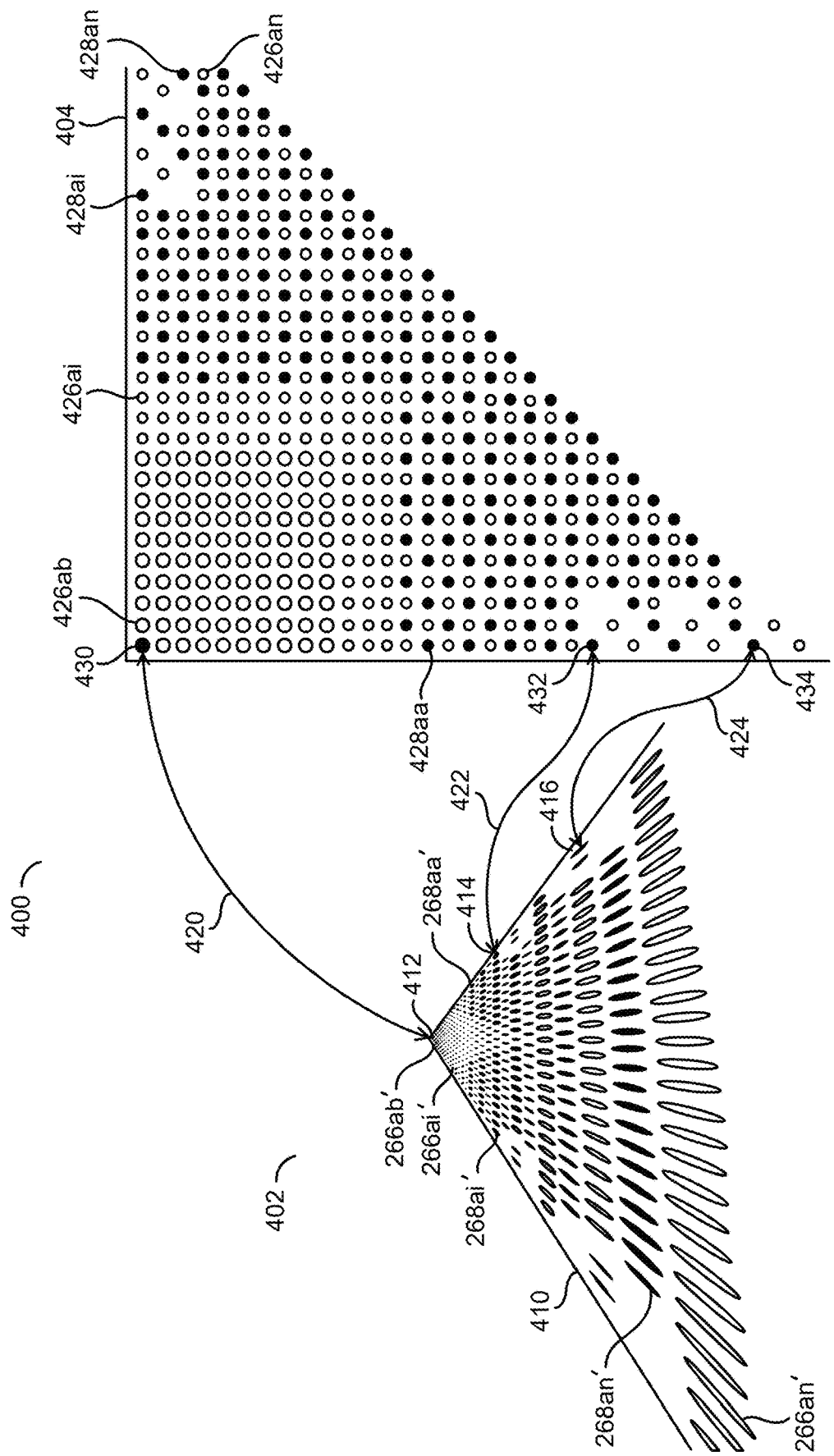
FIG. 9 is a diagram illustrating a mapping of a dot pattern from a correction using a distortion specification to a dot-coordinator based on a perspective matrix.

Referring to FIG. 9, a diagram illustrating a mapping of a dot pattern from a correction using a distortion specification to a dot-coordinator based on a perspective matrix is shown. The processor 102 may be configured to determine the distortion curve 228. The distortion curve 228 may be determined in response to calculating a polynomial fitting for each of the segments 386*a*-386*n*.

The calibration operations may determine the dot positions. For example, a center location (e.g., raw image locations) for each of the dots 266*aa*-266*cn* and the dots 268*aa*-268*cn* may be calculated based on the calibration scene 204. The center locations of the dots 266*aa*-266*cn* and the dots 268*aa*-268*cn* may provide valuable information to perform the calibration. The processor 102 may determine a mapping relationship between the center locations of the dots 266*aa*-266*cn* and the dots 268*aa*-268*cn* and a perspective transform. The polynomial fitting based on the mapping relationship combined with other operations (e.g., a perspective inverse transformation and applying the partial correction based on the distortion specification 206) may be used to derive the distortion curve 228.

For each of the segments 386a-386n of the raw image 250, the processor 102 may use the distortion specification 206 and the optical center 382 to determine partially corrected location points for each of the dots 266aa-266cn and the dots 268aa-268cn. For example, the processor 102 may transform the dots 266aa-266cn and the dots 268aa-268cn from the positions located on the raw image 250 to partially corrected location points based on the distortion specification 206 and the optical center 382. After the partial correction using the distortion specification 206 and the optical center 382, the processor 102 may map the partially corrected location points to a dot-coordinator location. A perspective matrix may be used to map the partially corrected location points to the dot-coordinator. In one example, the processor 102 may calculate the perspective matrix using a least squares operation. For example, the processor 102 may transform the partially corrected location points using the perspective matrix to dot-coordinator location points. After determining the dot-coordinator location points, the processor 102 may perform an inverse of the perspective matrix and an inverse of the distortion specification 206. The inverse of the perspective matrix and the inverse of the distortion specification 206 may determine a point similar to the partially corrected location points, but slightly different. The slightly different location points may be an accurate point location. The processor 102 may determine the polynomial fitting for the particular one of the segments 386a-386n. The processor 102 may repeat the calibration operations for each of the segments 386a-386n to determine the distortion curve 228.

A mapping 400 is shown. The mapping 400 may comprise a partially corrected segment 402 and a dot-coordinator 404. The dot-coordinator 404 may comprise the dots 266aa-266cn and the dots 268aa-268cn. The partially corrected segment 402 may comprise a partially corrected segment 410. The partially corrected segment 410 may comprise one of the segments 386a-386n after the distortion specification 206 and the optical center 382 have been applied. The partially corrected segment 410 may comprise partially corrected location points 266aa'-266an' and the partially corrected points 268aa'-268an'. In the example shown, the partially corrected segment 410 may comprise the partially corrected locations for the dots pattern 220 of the plane 210a. For example, the center-finding vision operations performed by the processor may determine the raw image position of the dot patterns 220-224 (e.g., after performing the inverse of the perspective correction and the inverse of the distortion specification 206). The raw image positions may be transformed to the partially corrected location points 266aa'-266an' and the partially corrected points 268aa'-268an' based on the distortion specification 206 and applying the optical center 382.

The partially corrected location points 266aa'-266an' and the partially corrected points 268aa'-268an' may comprise an example location 412, an example location 414 and an example location 416. The example locations 412-416 may be illustrative examples of mapping the partially corrected location points 266aa'-266an' and the partially corrected points 268aa'-268an' to the dot-coordinator 404. For example, a mapping operation 420 may map the example location 412 to the dot-coordinator 404, a mapping operation 422 may map the example location 414 to the dot-coordinator 404 and a mapping operation 424 may map the example location 416 to the dot-coordinator 404. The mapping operations 420-424 may be illustrative examples of the mapping operations performed to transform the partially corrected location points 266aa'-266an' and the partially corrected points 268aa'-268an' to the dot-coordinator 404. The perspective matrix may provide the mapping operations 420-424. The mapping operations 420-424 performed by the perspective matrix may be configured to transform the elliptical shape of the dot patterns 220-224 after the partial correction by the distortion specification 206 and the optical center 382 into circular shapes. In one example, the perspective matrix may be determined by the processor 102 using the least squares method.

The dot-coordinator may comprise the perspective corrected dots 426aa-426an and the perspective corrected dots 428aa-428an. The perspective corrected dots 426aa-426an and the perspective corrected dots 428aa-428an may have a circular shape. The circular shape of the perspective corrected dots 426aa-426an and the perspective corrected dots 428aa-428an may be enabled by the transformation calculations of the perspective matrix performed by the processor 102. The perspective corrected dots 426aa-426an and the perspective corrected dots 428aa-428an may comprise an example location 430, an example location 432 and an example location 434. The example locations 430-434 may be illustrative examples of mapping the partially corrected locations 266aa'-266an' and the partially corrected locations 268aa'-268an' to the perspective corrected dots 426aa-426an and the perspective corrected dots 428aa-428an of the dot-coordinator 404. In the example shown, the mapping operations 420 may map the example partially corrected location 412 to the example dot location 430, the mapping operation 422 may map the example partially corrected location 414 to the example dot location 432 and the mapping operation 424 may map the example partially corrected location 416 to the example dot location 434. While only the example mappings 420-424 are shown as an illustrative example, the processor 102 may map each of the partially corrected locations 266aa'-266an' and the partially corrected locations 268aa'-268an' to the respective perspective corrected dots 426aa-426an and the respective perspective corrected dots 428aa-428an.

After performing the mapping operations 420-424, the processor 102 may apply an inverse of the perspective matrix. The inverse of the perspective matrix may map the perspective corrected dots 426aa-426an and the perspective corrected dots 428aa-428an to locations similar to, but not exactly the same as the partially corrected locations 266aa'-266an' and the partially corrected locations 268aa'-268an'. The distortion may be added back to the similar locations after performing the inverse of the perspective matrix by using the inverse of the distortion specification 206. The similar locations after the inverse of the perspective matrix and applying the inverse of the distortion specification 206 to add the distortion back may be the accurately corrected locations (e.g., when taking into account the intrinsic parameters of the fisheye lens 160). The processor 102 may perform the polynomial fitting for the accurately corrected locations. The polynomial fitting for the accurately corrected locations may be one part of the distortion curve 228 for one of the segments 386a-386n. The processor 102 may repeat the calibration operations to determine the polynomial fitting for each of the segments 386a-386n. The combination of the polynomial fittings for each of the segments 386a-386n may be a final result for the distortion curve 228.

Figure 10:
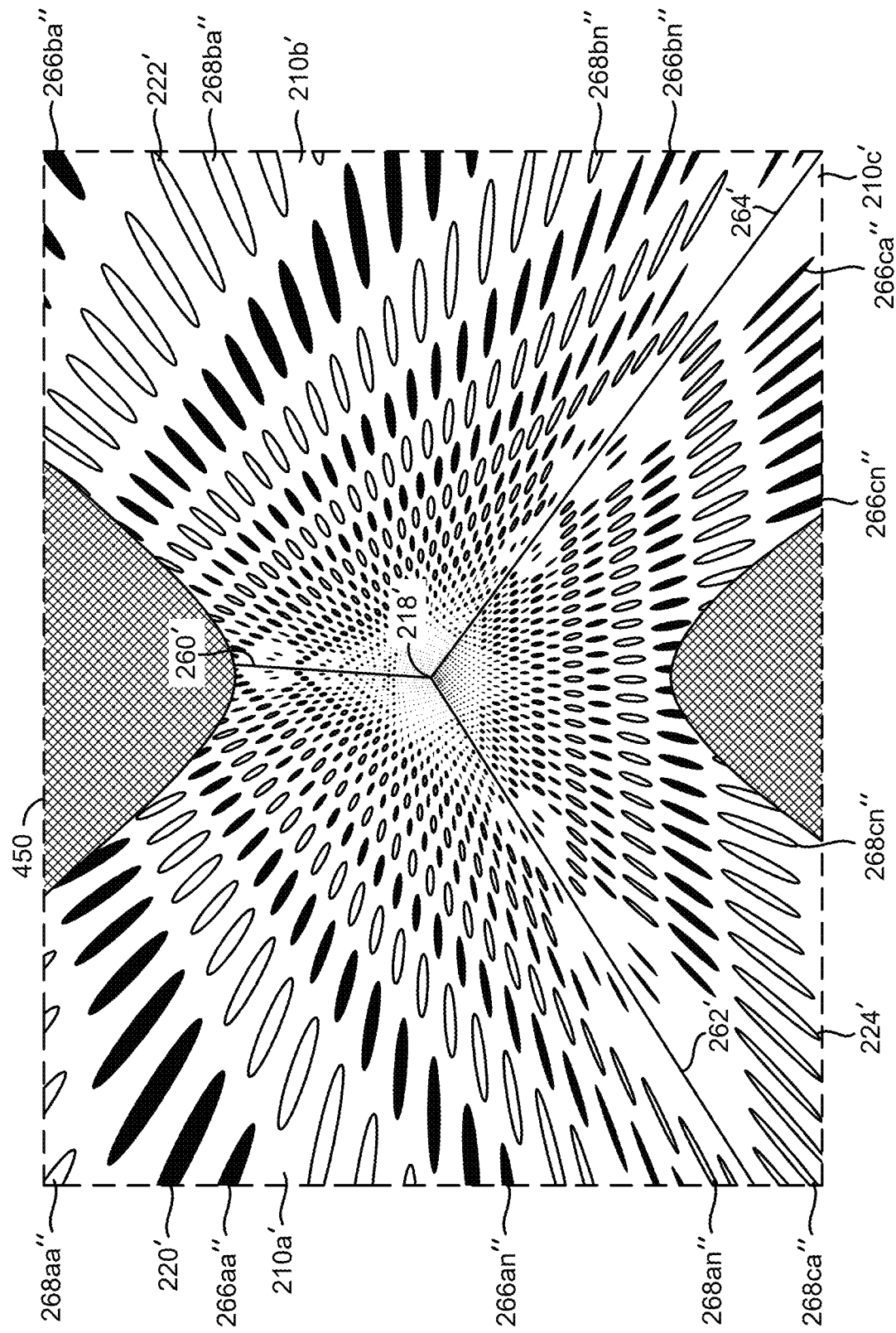
FIG. 10 is a diagram illustrating an example image of a calibration scene corrected by applying a distortion curve.

Referring to FIG. 10, a diagram illustrating an example image of a calibration scene corrected by applying a distortion curve is shown. An accurately corrected video frame 450 is shown. The accurately corrected video frame 450 may comprise a dewarped version of the raw image 250. The dewarping may be performed by the processor 102 on the raw image 250 in response to applying the distortion curve 228.

The accurately corrected video frame 450 may comprise pixel data captured by the capture device 104. In one example, the raw image 250 may be provided to the processor 102 as the signal VIDEO and the processor 102 may apply the distortion curve 228 to dewarp the raw image 250 into the accurately corrected video frame 450. In another example, the raw image 250 may be generated by the processor 102 in response to the pixel data provided in the signal VIDEO and the processor 102 may apply the distortion curve 228 to dewarp the raw image 250 into the accurately corrected video frame 450. In some embodiments, the raw image 250 may be pre-processed by the processor 102 before the distortion curve 228 is applied. In some embodiments, the raw image 250 may be dewarped into the accurately corrected video frame 450 using the distortion curve 228 and then pre-processing operations may be performed by the processor 102 on the accurately corrected video frame 450. In some embodiments, the accurately corrected video frame 450 may be an output of the processor 102. For example, the accurately corrected video frame 450 may be presented as human viewable video output to one or more video displays. In some embodiments, the accurately corrected video frame 450 may be utilized internal to the processor 102 to perform the computer vision operations. For example, the accurately corrected video frame 450 may be analyzed by the CNN 190b.

The accurately corrected video frame 450 may comprise planes 210a'-210c' and an origin point 218'. The planes 210a'-210c' may correspond to the planes 210a-210c of the calibration scene 204 in the raw image 250. The origin point 218' may correspond to the origin point 218 of the calibration scene 204 in the raw image 250.

The plane 210a' may comprise a dot pattern 220'. The dot pattern 220' may correspond to the dot pattern 220 of the plane 210a of the raw image 250. The plane 210b' may comprise a dot pattern 222'. The dot pattern 222' may correspond to the dot pattern 222 of the plane 210b of the raw image 250. The plane 210c' may comprise a dot pattern 224'. The dot pattern 224' may correspond to the dot pattern 224 of the plane 210c of the raw image 250.

The accurately corrected video frame 450 may comprise a line 260', a line 262' and a line 264'. The lines 260'-264' may be seams of the calibration scene 204. For example, the seams 260'-264' may correspond the respective seams 260-264 of the raw image 250.

The dot pattern 220' may comprise accurately corrected dots 266aa"-266an" and accurately corrected dots 268aa"-268an". The accurately corrected dots 266aa"-266an" and the accurately corrected dots 268aa"-268an" may correspond to the location of the similar locations determined after applying the inverse perspective matrix on the dot-coordinator 404 described in association with FIG. 9. The accurately corrected dots 266aa"-266an" and accurately corrected dots 268aa"-268an" may represent a corrected (or dewarped) view of dots 266aa-266an and the dots 268aa-268an of the raw image 250.

The dot pattern 222' may comprise accurately corrected dots 266ba"-266bn" and accurately corrected dots 268ba"-268bn". The accurately corrected dots 266ba"-266bn" and the accurately corrected dots 268ba"-268bn" may correspond to the location of the similar locations determined after applying the inverse perspective matrix on the dot-coordinator 404 described in association with FIG. 9. The accurately corrected dots 266ba"-266bn" and accurately corrected dots 268ba"-268bn" may represent a corrected (or dewarped) view of dots 266ba-266bn and the dots 268ba-268bn of the raw image 250.

The dot pattern 224' may comprise accurately corrected dots 266ca"-266cn" and accurately corrected dots 268ca"-268cn". The accurately corrected dots 266ca"-266cn" and the accurately corrected dots 268ca"-268cn" may correspond to the location of the similar locations determined after applying the inverse perspective matrix on the dot-coordinator 404 described in association with FIG. 9. The accurately corrected dots 266ca"-266cn" and accurately corrected dots 268ca"-268cn" may represent a corrected (or dewarped) view of dots 266ca-266cn and the dots 268ca-268cn of the raw image 250.

Figure 11:
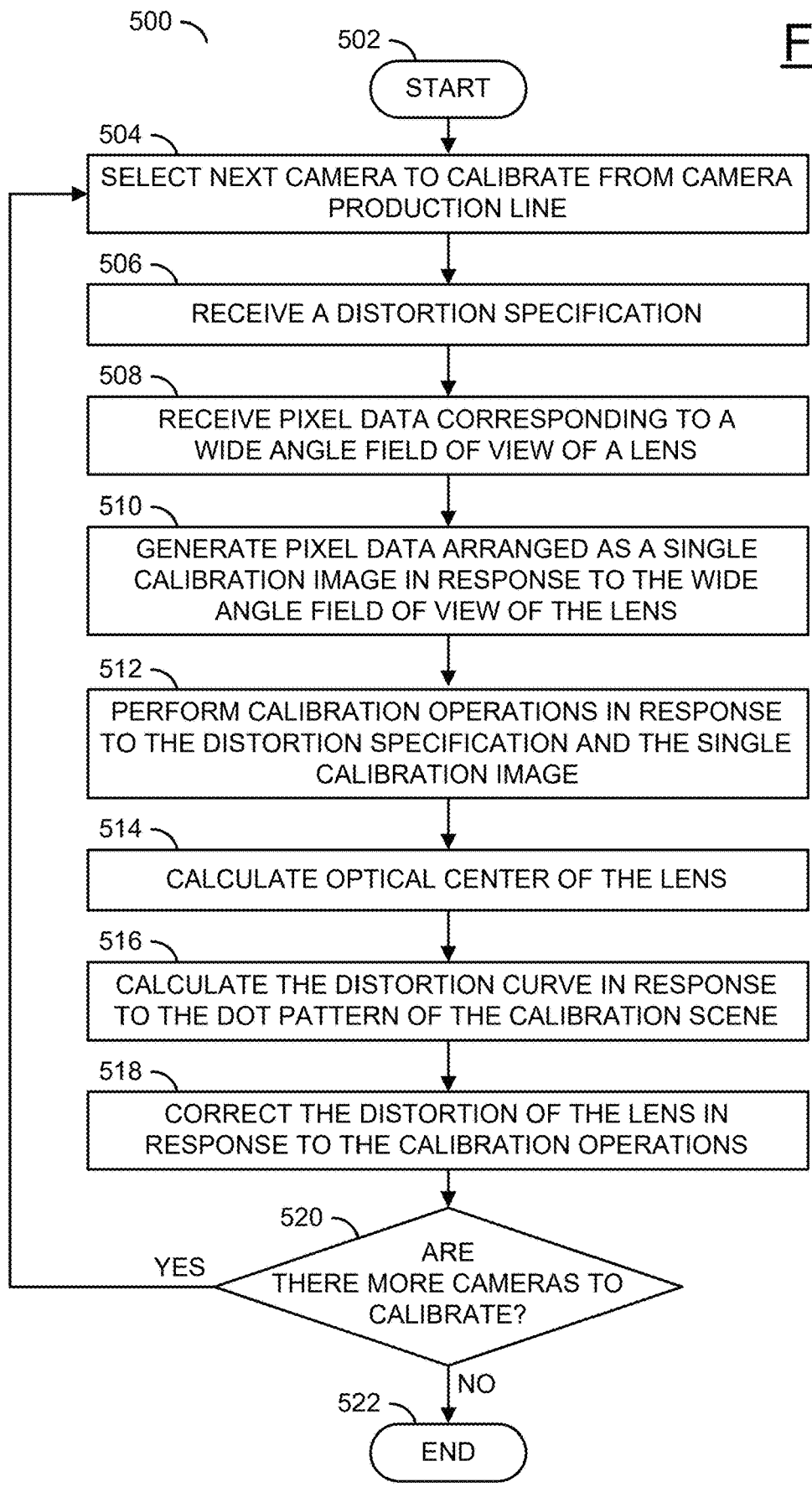
FIG. 11 is a flow diagram illustrating a method for performing fisheye lens optical center and distortion calibration using a single image for a camera production line.

Referring to FIG. 11, a method (or process) 500 is shown. The method 500 may perform fisheye lens optical center and distortion calibration using a single image for a camera production line. The method 500 generally comprises a step (or state) 502, a step (or state) 504, a step (or state) 506, a step (or state) 508, a step (or state) 510, a step (or state) 512, a step (or state) 514, a step (or state) 516, a step (or state) 518, a decision step (or state) 520, and a step (or state) 522.

The step 502 may start the method 500. In the step 504, a next one of the camera systems 100a-100n may be selected for calibration. For example, an engineer may perform the calibration for the fisheye lens 160 for each of the camera systems 100a-100n on a production line in a manufacturing process. The lens calibration using the single calibration image may enable a streamlined process for lens calibration. Next, in the step 506, the selected camera (e.g., one of the camera systems 100a-100n) may receive the distortion specification 206. For example, the distortion specification 206 may be provided by a manufacturer of the lens 160 and may be loaded into the memory 150 of the camera system 100. In the step 508, the processor 102 may receive pixel data corresponding to the wide angle field of view 202a-202b of the lens 160. For example, the image sensor 180 may generate the signal VIDEO comprising pixel data in response to the light input LIN captured by the capture device 104. Next, in the step 510, the processor 102 may process the pixel data arranged as a single video frame (e.g., the calibration image 208) in response to the wide angle field of view 202a-202b of the lens 160. Next, the method 500 may move to the step 512.

In the step 512, the processor 102 may perform the calibration operations in response to the distortion specification 206 and the single calibration image 208. For example, using the single calibration image 208 for calibration may enable a faster calibration for the camera systems 100a-100n on the production line (e.g., a streamlined calibration process compared to capturing multiple calibration images from different angles). Next, in the step 514, the processor 102 may calculate the optical center 382 of the lens 160. For example, the processor 102 may calculate straightness scores as described in association with FIGS. 6-7. In the step 516, the processor 102 may calculate the distortion curve 228 in response to the dot patterns 220-224 of the calibration scene 204. For example, the distortion curve 228 may be calculated as described in association with FIGS. 8-9. Next, in the step 518, processor 102 may correct the distortion caused by the lens 160 in response to the calibration operations. For example, the distortion curve 228 may be used to accurately correct the distortion of the fisheye lens 160. Next, the method 500 may move to the decision step 520.

In the decision step 520, the engineer (or technician or camera manufacturing employee) may determine whether there are more of the camera systems 100a-100n to calibrate. For example, the engineer may perform the calibration operations for each of the camera systems 100a-100n on the production line. If there are more of the camera systems 100a-100n to calibration on the production line, then the method 500 may return to the step 504. For example, the steps 506-518 may be repeated for each of the camera systems 100a-100n to provide a unique version of the distortion curve 228 for the intrinsic characteristics of each of the fisheye lenses implemented. If there are no more of the camera systems 100a-100n, then the method 500 may move to the step 522. The step 522 may end the method 500.

Figure 12:
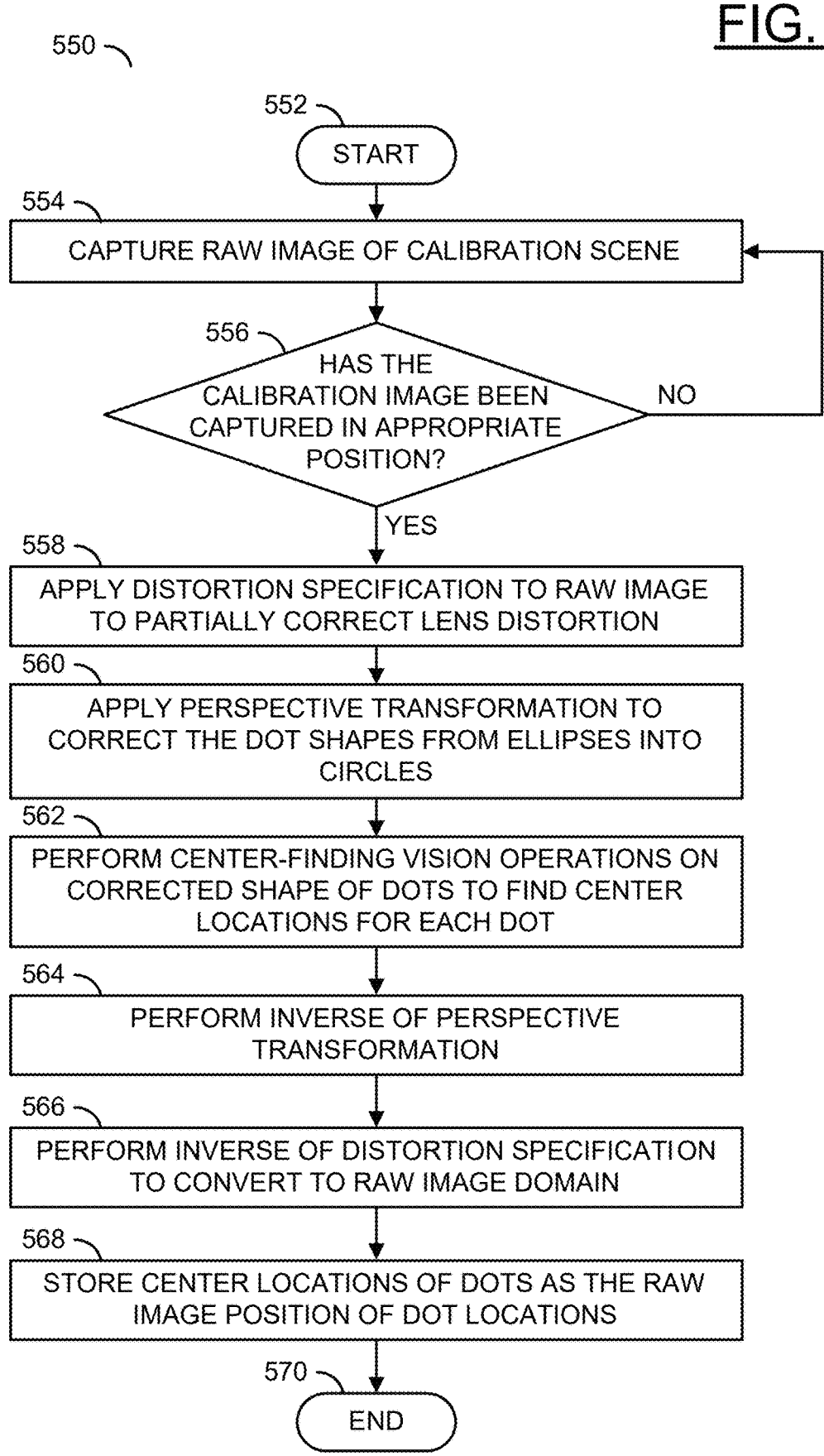
FIG. 12 is a flow diagram illustrating a method for detecting a calibration scene and raw image positions of dot locations.

Referring to FIG. 12, a method (or process) 550 is shown. The method 550 may detect a calibration scene and raw image positions of dot locations. The method 550 generally comprises a step (or state) 552, a step (or state) 554, a decision step (or state) 556, a step (or state) 558, a step (or state) 560, a step (or state) 562, a step (or state) 564, a step (or state) 566, a step (or state) 568, and a step (or state) 570.

The step 552 may start the method 550. In the step 554, the capture device 104 may capture the raw image 250 of the calibration scene 204. For example, the raw image 250 may be the calibration image 208. Next, in the decision step 556, the processor 102 and/or an engineer may determine whether the calibration image 208 has been captured in an appropriate position. For example, the appropriate position may comprise the axis 260 aligned vertically with the origin point 218 near the center of the calibration image 208 and the surfaces 210a-210c divided into three equal portions in the raw image 250. If the calibration image 208 is not appropriately captured, then the method 550 may return to the step 554 (e.g., the engineer may perform a manual adjustment of the corners of the three planes 210a-210c near a center of the field of view 202a-202b). If the calibration image 208 is appropriately captured, then the method 550 may move to the step 558.

In the step 558, the processor 102 may apply the distortion specification 206 to the raw image 250 to partially correct the lens distortion. For example, the distortion specification 206 may comprise a transformation operation. Next, in the step 560, the processor 102 may perform a perspective transform to correct the shape of the dots 266aa-266cn and the dots 268aa-268cn from ellipses (e.g., as shown in association with FIG. 5) to circles. In the step 562, the processor 102 may perform a center-finding vision operation on the corrected (e.g., circular) shape of each of the dots 266aa-266cn and the dots 268aa-268cn to find the center location (e.g., a pixel location) for each of the dots 266aa-266cn and the dots 268aa-268cn. Next, in the step 564, the processor 102 may perform an inverse of the perspective transformation on the center locations. In the step 566, the processor 102 may perform an inverse of the distortion specification 206 to convert the center locations back to the raw image domain. Next, in the step 568, the processor 102 may store the center locations for the dots (after inverse perspective transformation and inverse distortion specification 206) as the raw image position of the locations of the dots 266aa-266cn and the dots 268aa-268cn in the memory 150. For example, the raw points may be the output of the detection operations. Next, the method 550 may move to the step 570. The step 570 may end the method 550.

Figure 13:
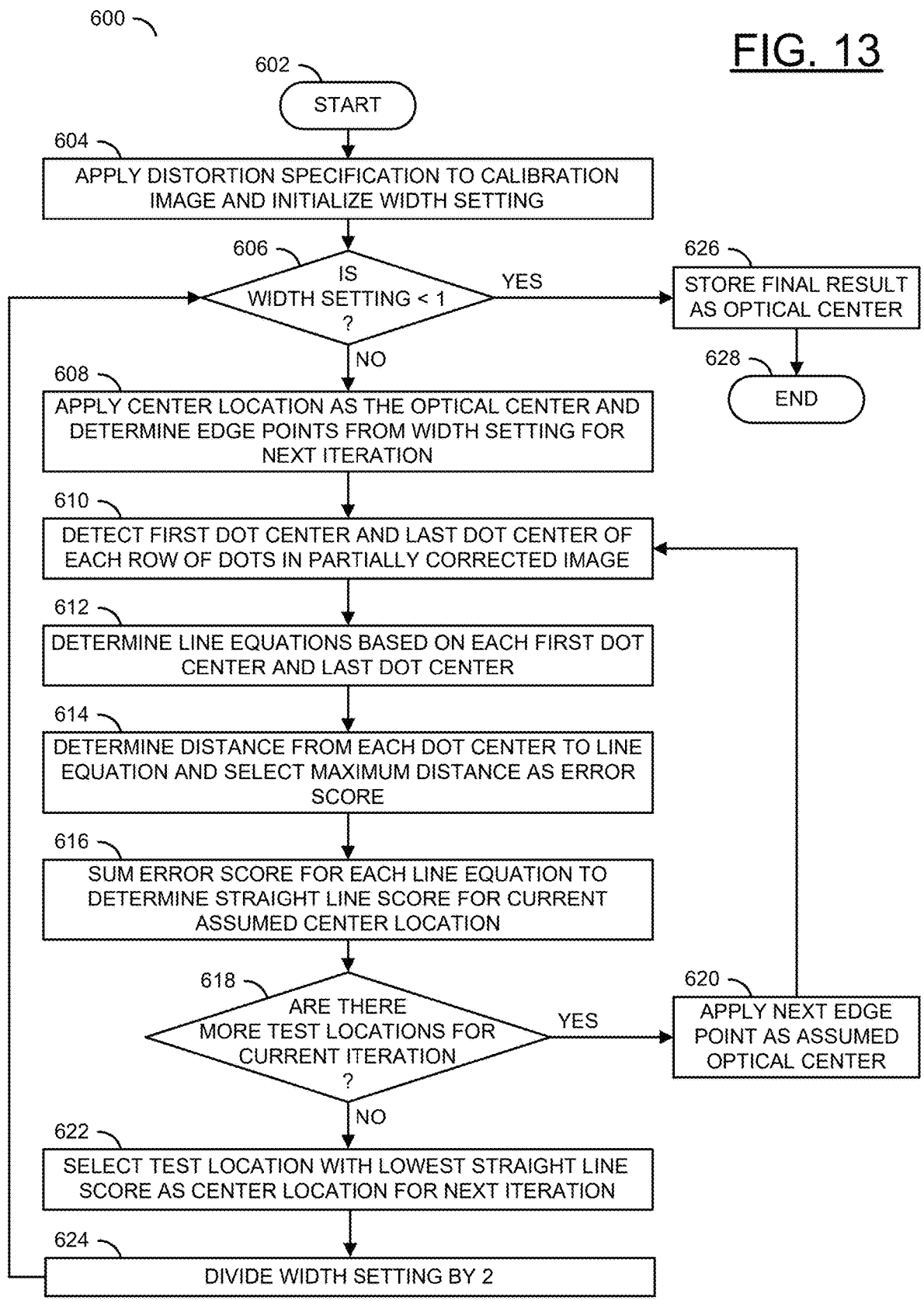
FIG. 13 is a flow diagram illustrating a method for calculating straightness scores to determine an optical center of the fisheye lens.

Referring to FIG. 13, a method (or process) 600 is shown. The method 600 may calculate straightness scores to determine an optical center of the fisheye lens. The method 600 generally comprises a step (or state) 602, a step (or state) 604, a decision step (or state) 606, a step (or state) 608, a step (or state) 610, a step (or state) 612, a step (or state) 614, a step (or state) 616, a decision step (or state) 618, a step (or state) 620, a step (or state) 622, a step (or state) 624, a step (or state) 626, and a step (or state) 628.

The step 602 may start the method 600. In the step 604, the processor 102 may apply the distortion specification 206 transformation to the calibration image 208 and initialize the width setting for the 3×3 optical center test table. In an example, the width setting may be approximately 50 pixels as an initial setting. Next, the method 600 may move to the decision step 606. In the decision step 606, the processor 102 may determine whether the width setting is less than a value of 1. For example, in the initial setting, the width setting may be greater than a value of 1. If the width setting is greater than 1, the method 600 may move to the step 608.

In the step 608, the processor 102 may apply the center location (e.g., the center location 308) as the optical center and determine the edge points from the width setting for the next iteration. For example, the processor 102 may perform a first iteration of the 3×3 optical center test table using the center location 308 and the edge points 312a-312h (based on a 50 pixel stride). In another example, the processor 102 may use the location with the lowest straight line score from the previous iteration as the assumed optical center and determine the edge points based on the halved value of the width setting. Next, in the step 610, the processor 102 may detect the first dot center 366a and the last dot center 366b for each row of the dots 266aa-266cn and the dots 268aa-268cn in the partially corrected image (e.g., as shown on the partially corrected plane 352 shown in association with FIG. 7). In the step 612, the processor 102 may determine the line equations 362a-362m based on the first dot center 366a and the last dot center 366b (e.g., one line per row of dots). Next, in the step 614, the processor 102 may determine the distance from each offset dot center 368a-368n to the line equation for each of the line equations 362a-362m. The maximum distance may be selected for each of the line equations 362a-362m. In the step 616, the processor 102 may sum the maximum distance selected from each of the line equations 362a-362m to determine the straight line score for the current assumed center location. For example, in the first iteration, and the first test point (e.g., assumed optical center location), the straight line score may be for the test point 308. Next, the method 600 may move to the decision step 618.

In the decision step 618, the processor 102 may determine whether there are more test locations for the current iteration of the 3×3 optical center test table. For example, if the center location and each of the edge points have been tested as an assumed optical center then the current iteration may be complete. If there are more test points, then the method 600 may move to the step 620. In the step 620, the processor 102 may apply the next one of the edge points as the assumed optical center. Next, the method 600 may return to the step 610. For example, after the center location 308, the first edge point 312a may be used as the next assumed optical center, and the steps 610-618 may be repeated. In the decision step 618, if all the test points have been tested (e.g., a straight line score has been determined for the center location 308 and each of the edge points 312a-312h for the first iteration), then the method 600 may move to the step 622. In the step 622, the processor 102 may select the test location with the lowest straight line score as the center location for the next iteration. For example, the processor 102 may compare each of the straight line score values. In the example shown in association with FIG. 6, for the first iteration, the edge point 312*d* may have the lowest straight line score. Next, in the step 624, the processor 102 may divide the width setting by 2. Next, the method 600 may return to the decision step 606.

In the decision step 606, if the width setting is greater than 1, then the method 600 may repeat the steps 608-624 for the next iteration. If the width setting is less than 1, then the method 600 may move to the step 626. In the step 626, the processor 102 may store the final result as the optical center 382 in the memory 150. The final result may be the pixel location with the lowest straight line score in the last iteration performed. In the example shown in association with FIG. 6, the final result may be the edge point 324. Next, the method 600 may move to the step 628. The step 628 may end the method 600.

Figure 14:
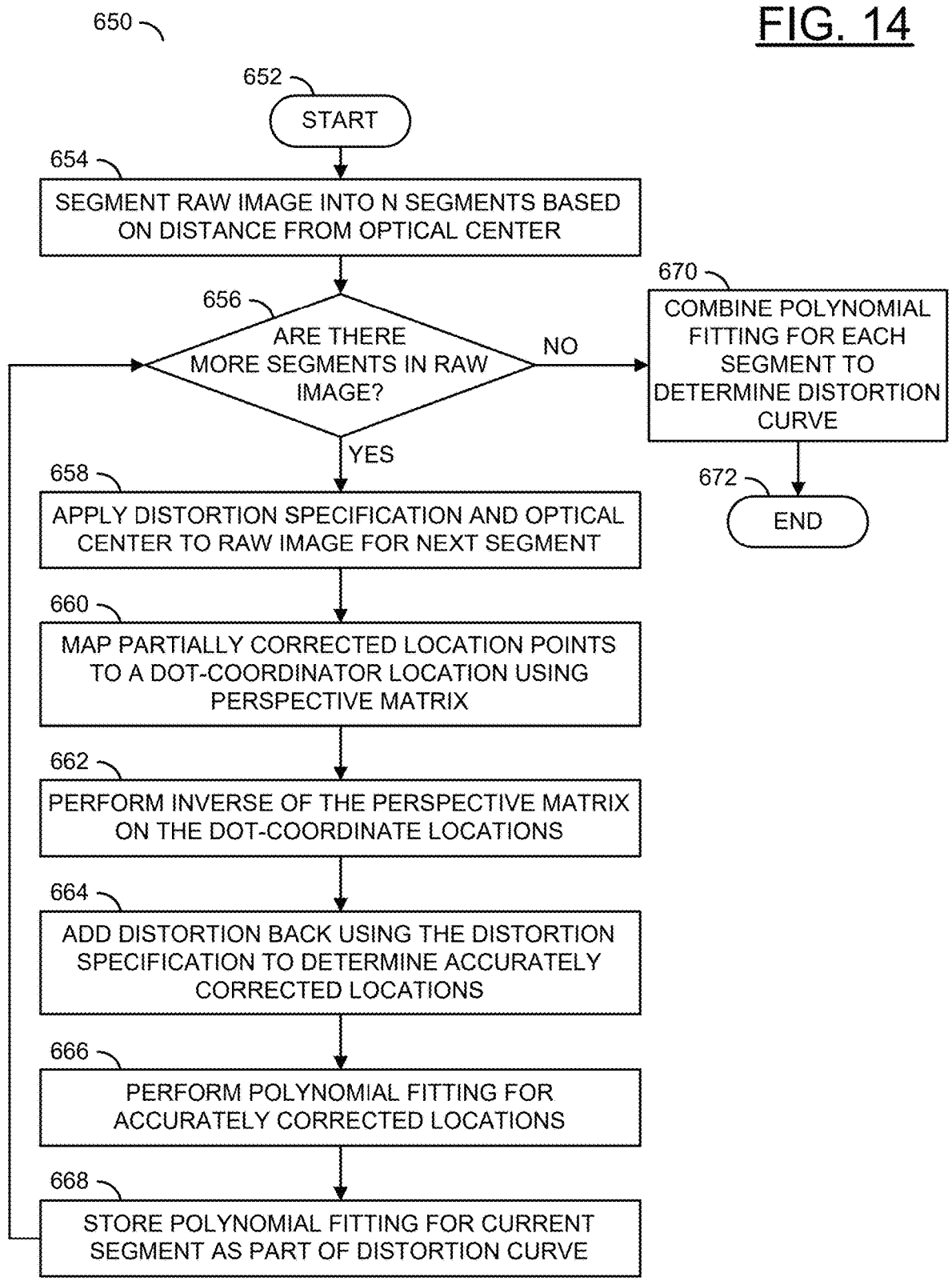
FIG. 14 is a flow diagram illustrating a method for calculating a distortion curve.

Referring to FIG. 14, a method (or process) 650 is shown. The method 650 may calculate a distortion curve. The method 650 generally comprises a step (or state) 652, a step (or state) 654, a decision step (or state) 656, a step (or state) 658, a step (or state) 660, a step (or state) 662, a step (or state) 664, a step (or state) 666, a step (or state) 668, a step (or state) 670, and a step (or state) 672.

The step 652 may start the method 650. In the step 654, the processor 102 may segment the raw image 250 into N segments (e.g., the segments 386*a*-386*n* as shown in association with FIG. 8) based on the distance from the optical center 382. Next, in the decision step 656, the processor 102 may determine whether there are more of the segments 386*a*-386*n* in the raw image 250. If there are more segments, then the method 650 may move to the step 658.

In the step 658, the processor 102 may apply the distortion specification 206 and the optical center 382 to the next one of the segments 386*a*-386*n*. Next, in the step 660, the processor 102 may map the partially corrected location points 266*aa*'-268*cn*' and 268*aa*'-268*cn*' to a corresponding dot coordinator location using the perspective matrix (e.g., the mapping operations 420-424 shown in association with FIG. 9). In the step 662, the processor 102 may perform an inverse of the perspective matrix on the dot-coordinate locations. For example, the inverse of the perspective matrix may result in similar locations to the partially corrected location points 266*aa*'-268*cn*' and 268*aa*'-268*cn*'. Next, in the step 664, the processor 102 may apply the distortion back to the partially corrected location points 266*aa*'-268*cn*' and 268*aa*'-268*cn*' using the distortion specification 206 (e.g., the inverse of the distortion specification 206) to determine the accurately corrected locations for the dots 266*aa*-268*cn* and the dots 268*aa*-268*cn*. In the step 666, the processor 102 may perform a polynomial fitting for the accurately corrected locations for the dots 266*aa*-268*cn* and the dots 268*aa*-268*cn*. Next, in the step 668, the processor 102 may store the polynomial fitting for the current one of the segments 386*a*-386*n* as part of the distortion curve 228 in the memory 150. Next, the method 650 may return to the decision step 656.

In the decision step 656, if there are more of the segments 386*a*-386*n*, then the processor 102 may repeat the steps 658-668 for a next one of the segments 386*a*-386*n*. If the polynomial fitting has been stored for each of the segments 386*a*-386*n*, then the method 650 may move to the step 670. In the step 670, the processor 102 may combine the polynomial fitting determined for each of segments 386*a*-386*n* to determine the distortion curve 228. Next, the method 650 may move to the step 672. The step 672 may end the method 650.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to receive pixel data corresponding to a wide angle field of view from a lens; and
   a processor configured to (i) receive a distortion specification corresponding said lens, (ii) generate pixel data arranged as a single calibration image in response to said wide angle field of view of said lens, (iii) perform calibration operations in response to (a) said distortion specification and (b) said single calibration image, and (iv) determine a distortion curve configured to correct a distortion of said lens in response to said calibration operations, wherein
   (i) a calibration scene is captured in said single calibration image,
   (ii) said calibration scene comprises three planes oriented as three sides of a cube with a dot pattern, and
   (iii) said calibration operations comprise using only said single calibration image for (a) calculating an optical center of said lens and (b) calculating said distortion curve in response to said dot pattern.

2. The apparatus according to claim 1, wherein said calibration operations performed using said single calibration image enables a streamlined process for lens calibration of cameras during a manufacturing of said cameras.

3. The apparatus according to claim 1, wherein said calibration scene comprises red and black dots for said dot pattern and red lines to separate said three planes.

4. The apparatus according to claim 1, wherein said calibration operations are further configured to perform a detection of said calibration scene to ensure accuracy for calculating said optical center of said lens.

5. The apparatus according to claim 4, wherein (i) a manual adjustment by a person is performed to set said wide angle field of view to enable said detection of said calibration scene, (ii) said manual adjustment comprises positioning respective corners of said three planes near a center of said wide angle field of view and (iii) said three planes are near said center of said wide angle field of view when (a) a line of said three planes divides said wide angle field of view into three equal portions and (b) a center red line of said three planes is vertical.

6. The apparatus according to claim 4, wherein said detection of said calibration scene comprises (i) detecting dot centers in said single calibration image, (ii) applying said distortion specification, (iii) performing a perspective correction to correct a shape of dots in said dot pattern to a circle, (iv) finding a center of circles in said dot pattern of said single calibration image, (v) performing an inverse of said perspective correction, (vi) performing an inverse of said distortion specification and (vii) storing a high-accuracy result of said center of said circles of said single calibration image.

7. The apparatus according to claim 1, wherein calculating said optical center comprises an optical center test table, a straightness scoring system based on an assumed optical center and said distortion specification.

8. The apparatus according to claim 7, wherein calculating said optical center comprises (i) generating said optical center test table, (ii) applying said straightness scoring system for each pixel in a search range by (a) applying said assumed optical center and said distortion specification, (b) calculating a straightness error score, and (c) getting an optical center of minimum error scoring, and (iii) selecting a lowest error score from said straightness scoring system from each of said pixels in said search range as said optical center.

9. The apparatus according to claim 8, wherein said straightness error score is determined in response to (i) detecting a center of a first dot and a last dot in a row of dots, (ii) calculating an line equation based on said first dot and said last dot, (iii) determining an offset center of each dot in said row of dots in between said first dot and said last dot, (iv) calculating a distance between said offset center of each dot from said line equation and (v) selecting said distance with a largest value as said straightness error score.

10. The apparatus according to claim 7, wherein said optical center test table is a 3×3 test table.

11. The apparatus according to claim 1, wherein said distortion curve is calculated in response to segmenting said single calibration image into a plurality of segments based on distance, said optical center and said distortion specification.

12. The apparatus according to claim 11, wherein (i) said distortion curve is calculated in response to a final result determined by combining intermediate segment data determined for each of said plurality of segments and (ii) said intermediate segment data for each of said plurality of segments is determined in response to (a) applying said optical center and said distortion specification to one of said plurality of segments, (b) performing a perspective transform, (c) performing an inverse of said perspective transform, (d) performing an inverse of said distortion specification and (e) determining a polynomial fit.

13. The apparatus according to claim 12, wherein said perspective transform is determined based on a mapping relationship with said dot pattern.

14. The apparatus according to claim 13, wherein said perspective transform is performed in response to a perspective matrix generated from said mapping relationship.

15. The apparatus according to claim 14, wherein (i) said perspective matrix is determined based on a least squares operation and (ii) said inverse of said perspective transform generates a result similar to, but different than, said intermediate segment data.

16. The apparatus according to claim 1, wherein said distortion is caused by intrinsic parameters of said lens.

17. The apparatus according to claim 1, wherein said calibration operations enable generating said distortion curve using said single calibration image faster than a Zhang-camera calibration and using fewer calibration images.

18. The apparatus according to claim 1, wherein said lens comprises a fisheye lens.

19. The apparatus according to claim 1, wherein (i) a detection operation is performed to determine a center of circles in said dot pattern of said single calibration image, (ii) said optical center is calculated in response to detecting said center of said circles in said dot pattern of single calibration image and performing a straightness scoring system, and (iii) said distortion curve is determined in response to using said optical center and said distortion specification to determine a polynomial fitting.

* * * * *